United States Patent
Shindo

(10) Patent No.: US 10,433,188 B2
(45) Date of Patent: Oct. 1, 2019

(54) CONTROL APPARATUS, BASE STATION APPARATUS, RADIO TERMINAL, AND METHOD FOR UPDATING NEIGHBOUR RELATION TABLE

(71) Applicant: NEC Corporation, Tokyo (JP)

(72) Inventor: Masato Shindo, Tokyo (JP)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 15/122,578

(22) PCT Filed: Oct. 7, 2014

(86) PCT No.: PCT/JP2014/005101
§ 371 (c)(1),
(2) Date: Aug. 30, 2016

(87) PCT Pub. No.: WO2015/140848
PCT Pub. Date: Sep. 24, 2015

(65) Prior Publication Data
US 2017/0070896 A1  Mar. 9, 2017

(30) Foreign Application Priority Data
Mar. 18, 2014  (JP) .................................. 2014-055184

(51) Int. Cl.
*H04L 12/28* (2006.01)
*H04W 24/02* (2009.01)
(Continued)

(52) U.S. Cl.
CPC ....... *H04W 24/02* (2013.01); *H04W 36/0083* (2013.01); *H04W 36/14* (2013.01);
(Continued)

(58) Field of Classification Search
CPC . H04W 24/02; H04W 36/0083; H04W 36/18; H04W 36/14; H04W 36/0055; H04W 88/08
(Continued)

(56) References Cited

U.S. PATENT DOCUMENTS 8,417,246 B2 * 4/2013 Olofsson ............... H04W 24/08
455/436
8,897,783 B2 * 11/2014 Olofsson ............... H04W 24/08
455/423

(Continued)

FOREIGN PATENT DOCUMENTS

EP        2403198 A1    1/2012
JP     2011-259203 A   12/2011
(Continued)

OTHER PUBLICATIONS

International Search Report corresponding to PCT/JP2014/005101, dated Jan. 13, 2015, 1 page.
(Continued)

*Primary Examiner* — Chuong T Ho
(74) *Attorney, Agent, or Firm* — Wilmer Cutler Pickering Hale and Dorr LLP

(57) ABSTRACT

A control apparatus (1) is configured to automatically update a neighbour relation table (40, 131) of a source cell (10A). The control apparatus (1) is further configured to add, to the neighbour relation table (40, 131), a new entry (41) indicating a neighbour-cell relation from the source cell (10A) to another cell (10B) different from both the source cell (10A) and a target cell (10C) of a handover from the source cell (10A), in response to receiving a first message (S105) that is issued when a radio terminal (2) that has experienced a failure involving disconnection of a radio link connection in the source cell (10A) or in the target cell (10C) attempts to re-establish the radio link connection to the other cell (Continued)

(10B). This contributes to updating the neighbour-cell relations in response to detection of a handover failure.

18 Claims, 24 Drawing Sheets

(51) Int. Cl.
*H04W 36/14* (2009.01)
*H04W 36/18* (2009.01)
*H04W 36/00* (2009.01)
H04W 88/08 (2009.01)

(52) U.S. Cl.
CPC ........ *H04W 36/18* (2013.01); *H04W 36/0055* (2013.01); *H04W 88/08* (2013.01)

(58) Field of Classification Search
USPC .................................................. 370/392, 389
See application file for complete search history.

(56) References Cited

U.S. PATENT DOCUMENTS

| | | | | |
|---|---|---|---|---|
| 9,479,984 | B2* | 10/2016 | Olofsson | H04W 24/08 |
| 2012/0202557 | A1* | 8/2012 | Olofsson | H04W 24/08 |
| | | | | 455/525 |
| 2013/0084874 | A1 | 4/2013 | Fujishiro et al. | |
| 2013/0130695 | A1* | 5/2013 | Ryu | H04W 36/00835 |
| | | | | 455/438 |
| 2013/0183960 | A1* | 7/2013 | Olofsson | H04W 24/08 |
| | | | | 455/423 |
| 2013/0343345 | A1 | 12/2013 | Dinan | |
| 2015/0056999 | A1* | 2/2015 | Olofsson | H04W 24/08 |
| | | | | 455/436 |
| 2015/0092552 | A1* | 4/2015 | Bajj | H04W 28/08 |
| | | | | 370/235 |
| 2016/0095025 | A1* | 3/2016 | Wegmann | H04W 24/02 |
| | | | | 455/436 |

FOREIGN PATENT DOCUMENTS

| | | |
|---|---|---|
| JP | 2013-192095 A | 9/2013 |
| KR | 10-2010-0104022 A | 9/2010 |
| RU | 2482625 C2 | 5/2013 |
| WO | WO-2012/019362 A1 | 2/2012 |

OTHER PUBLICATIONS

3GPP TS 36.423 V9.6.0 (Mar. 2011), "3rd Generation Partnership Project; Technical Specification Group Radio Access Network; Evolved Universal Terrestrial Radio Access Network (E-UTRAN); X2 application protocol (X2AP), (Release 9)", Mar. 2011, 121 pages.
3GPP TS 36.300 V9.10.0 (Dec. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 9)", Dec. 2012, 174 pages.
Russian Office Action issued by the Russian Federal Institute of Industrial Property for Russian Application No. 2016140619/07(064813) dated Nov. 10, 2017 (16 pages).
3GPP TS 36.300, V12.0.0 Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 208 pages (Dec. 2013).
Korean Office Action issued by the Korean Intellectual Property Office for Korean Application No. 10-2016-7028352 dated Jul. 17, 2017 (14 pages).
Nokia Siemens Networks, "Report of email discussion [79bis#25] Joint/SON: Additional information in RLF report for inter-RAT MRO," 3GPP TSG-RAN WG2, Meeting #80, R2-125326, Agenda item 5.4, New Orleans, pp. 1-11 (Nov. 12-16, 2012).
Partial Supplementary European Search Report issued by the European Patent Office for European Application No. 14886633.8 dated Jul. 20, 2017 (16 pages).
India Examination Report issued in Indian Patent Application No. 201617031687, dated Mar. 28, 2019, 6 pages.

\* cited by examiner

| NR | TCI | | NO REMOVE | NO HO | NO X2 |
|---|---|---|---|---|---|
| | ECGI | PCI | | | |
| 1 | ECGI#1 | PCI#1 | | | |
| 2 | ECGI#2 | PCI#2 | X | | X |
| 3 | ECGI#3 | PCI#3 | X | | |
| *** | *** | *** | *** | *** | *** |

Columns 2–3 (ECGI, PCI) are grouped under NEIGHBOUR RELATION. Columns 4–6 (NO REMOVE, NO HO, NO X2) are grouped under OAM CONTROLLED NEIGHBOUR RELATION ATTRIBUTES.

3GPP TS 36.423 § 9.1.2.18 RLF INDICATION

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | IGNORE |
| FAILURE CELL PCI | M | | INTEGER (0..503, ...) | PHYSICAL CELL IDENTIFIER | YES | IGNORE |
| RE-ESTABLISHMENT CELL ECGI | M | | ECGI 9.2.14 | | YES | IGNORE |
| *RE-ESTABLISHMENT CELL PCI* | *O* | | *INTEGER (0..503, ...)* | *PHYSICAL CELL IDENTIFIER* | *YES* | *IGNORE* |
| *RE-ESTABLISHMENT CELL TAC* | *O* | | *OCTET STRING (2)* | *TRACKING AREA CODE* | *YES* | *IGNORE* |
| *RE-ESTABLISHMENT CELL EARFCN* | *O* | | *INTEGER (0..maxEARFCN)* | *DL-EARFCN FOR FDD OR EARFCN FOR TDD* | *YES* | *IGNORE* |
| C-RNTI | M | | BIT STRING (SIZE (16)) | C-RNTI CONTAINED IN THE RRC RE-ESTABLISHMENT REQUEST MESSAGE | YES | IGNORE |
| ShortMAC-I | O | | BIT STRING (SIZE (16)) | ShortMAC-I CONTAINED IN THE RRC RE-ESTABLISHMENT REQUEST MESSAGE | YES | IGNORE |
| UE RLF REPORT CONTAINER | O | | OCTET STRING | rlfReport CONTAINED IN THE UE INFORMATION RESPONSE MESSAGE [9] | YES | IGNORE |

| NR | TCI | | EARFCN | TAC | NO REMOVE | NO HO | NO X2 |
|---|---|---|---|---|---|---|---|
| | ECGI | PCI | | | | | |
| 1 | ECGI#1 | PCI#1 | EARFCN#1 | TAC#1 | | | |
| 2 | ECGI#2 | PCI#2 | EARFCN#2 | TAC#2 | X | | |
| 3 | ECGI#3 | PCI#3 | EARFCN#3 | TAC#3 | X | | X |
| 4 | *ECGI OF CELL 10B* | *PCI OF CELL 10B* | *EARFCN OF CELL 10B* | *TAC OF CELL 10B* | | | |
| *** | *** | *** | *** | *** | *** | *** | *** |

NEIGHBOUR RELATION — OAM CONTROLLED NEIGHBOUR RELATION ATTRIBUTES

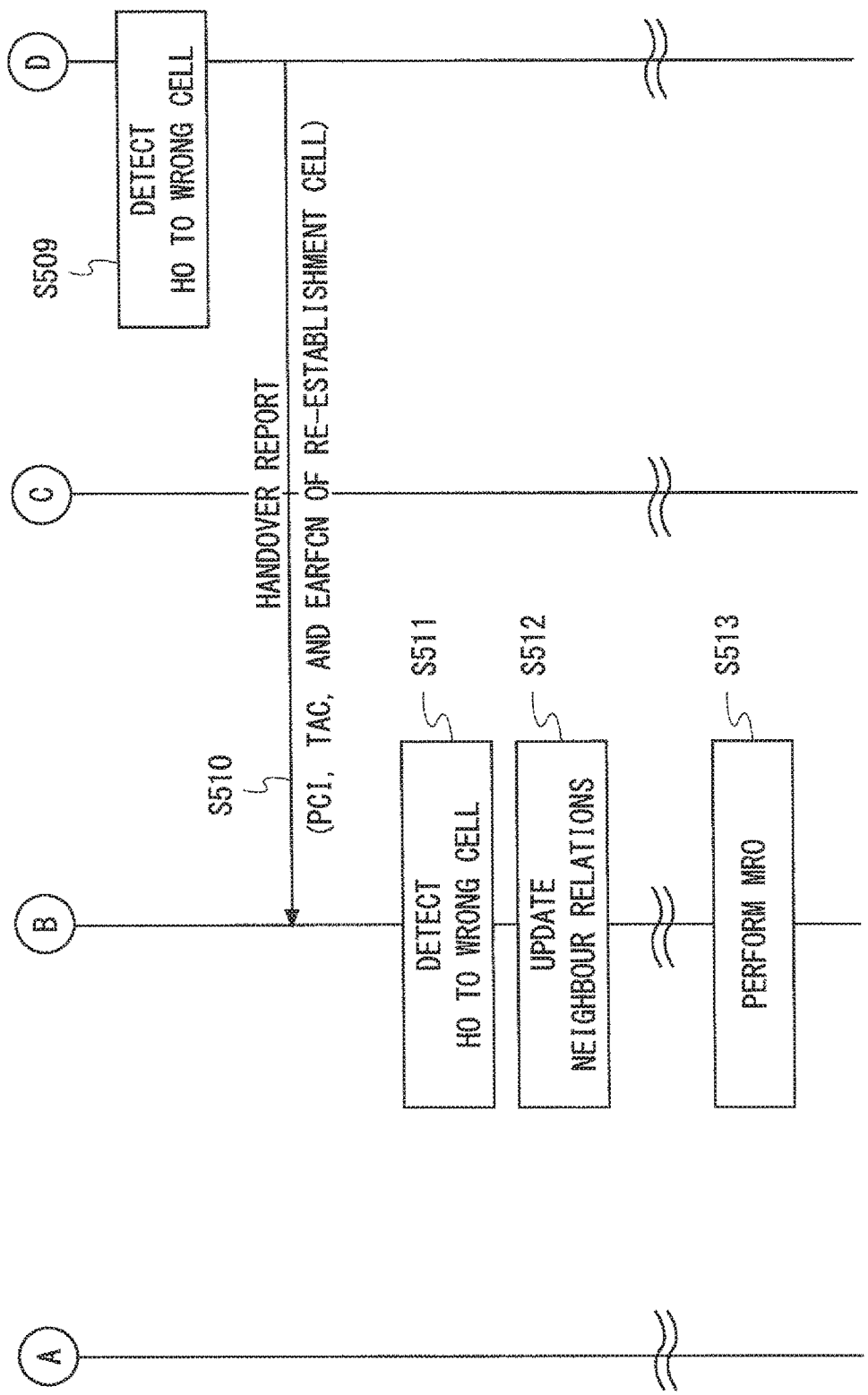

Fig. 18

3GPP TS 36.423 § 9.1.2.19 HANDOVER REPORT

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | IGNORE |
| HANDOVER REPORT TYPE | M | | ENUMERATED (HO TOO EARLY, ...) | | YES | IGNORE |
| HANDOVER CAUSE | M | | 9.2.6 | INDICATES HANDOVER CAUSE EMPLOYED FOR HANDOVER FROM eNB2 TO eNB1 | YES | IGNORE |
| SOURCE CELL ECGI | M | | ECGI 9.2.14 | ECGI OF SOURCE CELL FOR HANDOVER PROCEDURE (IN eNB2) | YES | IGNORE |
| FAILURE CELL ECGI | M | | ECGI 9.2.14 | ECGI OF TARGET CELL FOR HANDOVER PROCEDURE (IN eNB1) | YES | IGNORE |
| RE-ESTABLISHMENT CELL ECGI | C-IfHoTo WrongCell | | ECGI 9.2.14 | PHYSICAL CELL IDENTIFIER | YES | IGNORE |
| *RE-ESTABLISHMENT CELL PCI* | *C-IfHoTo WrongCell* | | *INTEGER (0..503, ...)* | *PHYSICAL CELL IDENTIFIER* | *YES* | *IGNORE* |
| *RE-ESTABLISHMENT CELL TAC* | *C-IfHoTo WrongCell* | | *OCTET STRING (2)* | *TRACKING AREA CODE* | *YES* | *IGNORE* |
| *RE-ESTABLISHMENT CELL EARFCN* | *C-IfHoTo WrongCell* | | *INTEGER (0..maxEARFCN)* | *DL-EARFCN FOR FDD OR EARFCN FOR TDD* | *YES* | *IGNORE* |

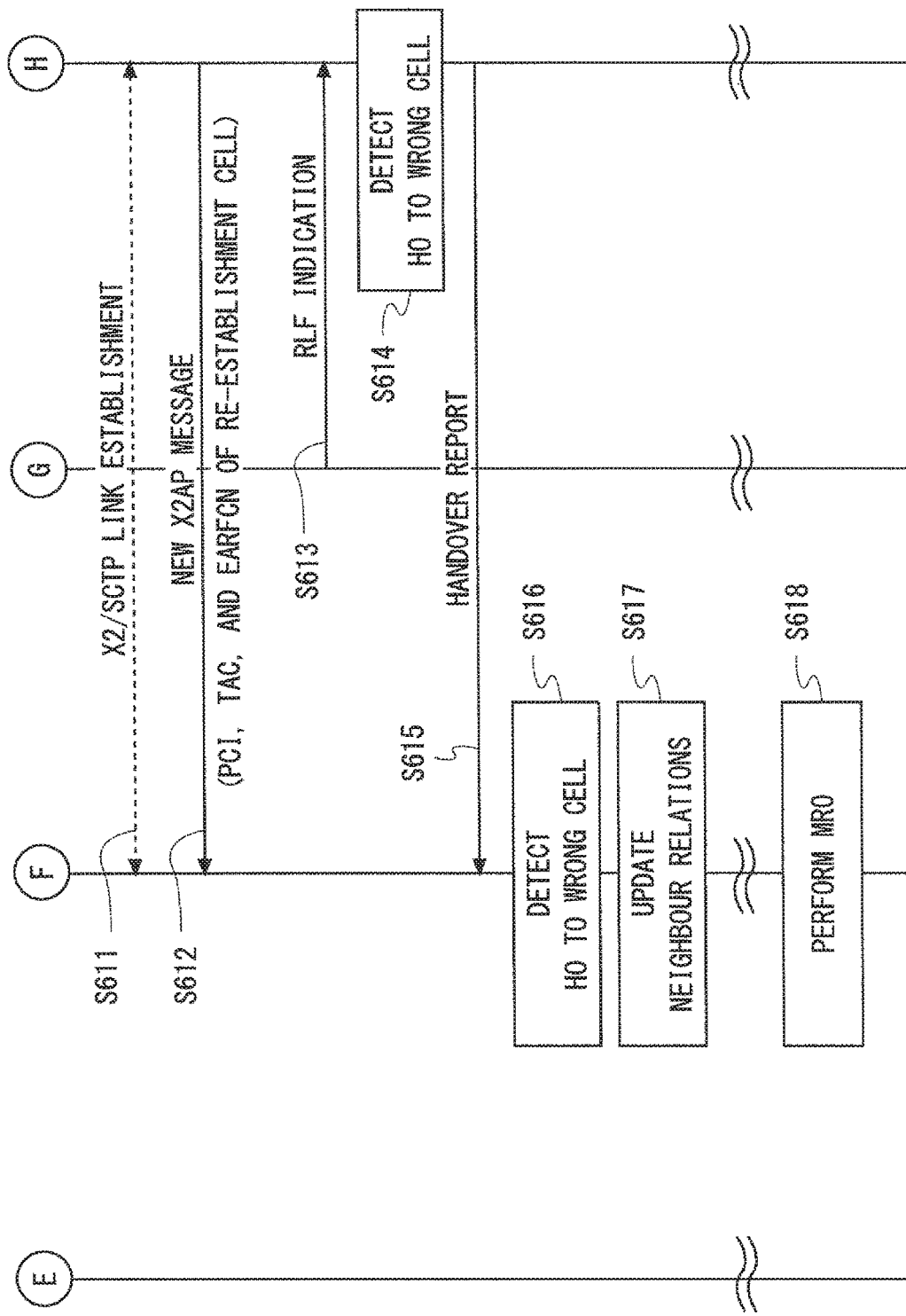

US 10,433,188 B2

CONTROL APPARATUS, BASE STATION APPARATUS, RADIO TERMINAL, AND METHOD FOR UPDATING NEIGHBOUR RELATION TABLE

CROSS-REFERENCE TO RELATED APPLICATIONS

This application is a national stage application of International Application No. PCT/JP2014/005101 entitled "CONTROL APPARATUS, BASE STATION APPARATUS, RADIO TERMINAL, AND METHOD FOR UPDATING NEIGHBOUR RELATION TABLE," filed on Oct. 7, 2014, which claims the benefit of the priority of Japanese Patent Application No. 2014-055184 filed on Mar. 18, 2014, the disclosures of each of which are hereby incorporated by reference in their entirety.

TECHNICAL FIELD

The disclosure of the present application relates to a Self-Organizing Network (SON) technology for self-configuration or self-optimization of a radio access network (RAN), and more particularly, to an Automatic Neighbour Relation (ANR) function.

BACKGROUND ART

Non-Patent Literature 1, at chapter 22, defines a Self-Organizing Network (SON) technology for self-configuration and self-optimization of an Evolved Universal Terrestrial Radio Access Network (E-UTRAN). The E-UTRAN is a Long Term Evolution (LTE) radio access network. The SON technology defined in Chapter 22 of Non-Patent Literature 1 includes dynamic configuration of S1-MME and X2 interfaces, an Automatic Neighbour Relation (ANR) function, Mobility Load Balancing, and Mobility Robustness Optimization (MRO). The S1-MME interface (or S1-MME link) is a communication interface between an evolved NodeB (eNB) and a Mobility Management Entity (MME) located in a core network (i.e., Evolved Packet Core (EPC)). The X2 interface (or X2 link) is an inter-eNB communication interface. The eNB is an E-UTRAN/Long Term Evolution (LTE) base station. The MME is a control entity located in the core network (i.e., Evolved Packet Core (EPC)), and performs, for example, mobility management (e.g., location registration) of a User Equipment (UE), and bearer management (e.g., bearer establishment, bearer modification, bearer release). The UE is an E-UTRAN/LTE radio terminal (or mobile terminal).

The ANR function is one of the important features of the SON. An object of the ANR function is to release an operator from the burden of manually managing neighbour-cell relations (i.e., neighbour relations (NRs)). FIG. 1 shows a plurality of elements included in the ANR function disclosed in Non-Patent Literature 1. FIG. 2 shows a specific example of a neighbour relation table (NRT) disclosed in Non-Patent Literature 1.

As shown in FIG. 1, the ANR function resides in an evolved NodeB (eNB) and manages the conceptual NRT. The Neighbour Detection Function finds new neighbour cells, and adds NRs corresponding to the neighbour cells to the NRT. The Neighbour Removal Function removes unnecessary NRs from the NRT.

The NRT contains entries of all neighbour-cell relations (NRs) of cells controlled by the eNB. An NR in the context of the NRT is defined as a unidirectional cell-to-cell relation from a source cell to a target cell. As shown in FIG. 2, the NRT contains a Target Cell Identifier (TCI) to specify a target cell for each NR. When the target cell is an E-UTRAN cell, the TCI corresponds to the E-UTRAN Cell Global Identifier (ECGI) and Physical Cell Identity (PCI) of the target cell. The ECGI consists of a 3-byte Public Land Mobile Network Identity (PLMN ID) and 28-bit E-UTRAN Cell Identifier (ECI), and is used to specify the E-UTRAN cell globally uniquely. The PLMN ID is a unique identifier of a PLMN, and the ECI is a unique identifier of an E-UTRAN cell in a specific PLMN. The PCI is a number from 0 to 503 and distinguishes a cell from its immediate neighbour cells. In the PLMN, 504 (0 to 503) different PCIs are repeatedly used. That is, the PCI cannot uniquely specify a cell within a PLMN or globally.

Further, as shown in FIG. 2, an entry of each NR in the NRT can contain a plurality of attributes. These attributes include three attributes (i.e., No Remove flag, No HO flag, and No X2 flag) which are controlled by an Operation and Maintenance (OAM) system. The No Remove flag indicates whether or not the eNB can remove the corresponding NR. The No HO flag indicates whether or not the eNB can use the corresponding NR for the purpose of handover. The No X2 flag indicates whether or not the eNB can use the X2 interface (X2 link) in order to initiate a procedure with an eNB that controls a target cell.

In the case of Intra-LTE and Intra-frequency, the ANR function works as follows. The ANR function relies on cells that broadcast their globally unique identifiers (i.e., ECGIs). The serving eNB having the ANR function instructs each UE to perform normal measurements on neighbour cells. Each UE sends a normal measurement report to the serving eNB. This normal measurement report contains PCIs of neighbour cells, but does not contain their ECGIs.

When a measurement report from a UE indicates a new PCI that is not known by the serving eNB, the serving eNB instructs the UE to perform dedicated reporting using the newly found PCI as a parameter. When the UE has found out the new cell corresponding to the newly found PCI, the UE detects system information including the ECGI, Tracking Area Code (TAC), and all available PLMN ID(s), and reports the information to the serving eNB in the dedicated reporting. The TAC indicates a tracking area to which a cell of an eNB belongs. The TAC is a unique identifier within a PLMN and consists of 16 bits.

The serving eNB determines to add, to the NRT, a NR from the source cell to the newly found cell by using the PCI and ECGI which are reported from the UE. The serving eNB may use the PCI and ECGI, which are reported from the UE, to loop up a transport layer address of the eNB controlling the newly found cell. Further, the serving eNB may use the PCI and ECGI to set up an X2 interface (X2 link) with the eNB controlling the newly found cell.

CITATION LIST

Non Patent Literature

[Non-Patent Literature 1] 3GPP TS 36.300 V9.10.0 (2012-12), "3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 9)", December, 2012

[Non-Patent Literature 2] 3GPP TS 36.423 V9.6.0 (2011-03), "3rd Generation Partnership Project; Technical Specification Group Radio Access Network; Evolved Universal Terrestrial Radio Access Network (E-UTRAN); X2 application protocol (X2AP) (Release 9)", March, 2011

SUMMARY OF INVENTION

Technical Problem

As can be understood from the above, in the ANR function, addition or removal of NRs regarding a cell is executed based on measurement reports from UEs to the eNB that controls this cell. In other words, it is not assumed that the execution of the ANR function is triggered by detection of handover failures such as Too Late Handover and Handover to Wrong Cell. The terms "Too Late Handover" and "Handover to Wrong Cell" used herein are defined as follows.

(1) A first type of Too Late Handover indicates a situation where a UE experiences a radio link failure (RLF) involving disconnection of a Radio Resource Control (RRC) connection in the source cell during execution of a handover procedure from the source cell to the target cell, and after that, the UE attempts to re-establish a Radio Resource Control (RRC) connection to the target cell.

(2) A second type of Too Late Handover indicates a situation where a UE experiences RLF in the source cell before initiation of handover, and after that, the UE attempts to re-establish an RRC connection to a cell different from the source cell.

(3) A first type of Handover to Wrong Cell indicates a situation where a UE experiences RLF in the target cell during a handover procedure from the source cell to the target cell or immediately after completion of handover, and after that, the UE attempts to re-establish an RRC connection to another cell different from both the source and target cells.

(4) A second type of Handover to Wrong Cell indicates a situation where a UE experiences RLF in the source cell during a handover procedure from the source cell to the target cell, and after that, the UE attempts to re-establish an RRC connection to another cell different from both the source and target cells.

The definitions of handover failures described above are not definite, and the handover failures may be defined in different ways. For example, the second type of Handover to Wrong Cell may be included in the second type of Too Late Handover. This is because the second type of Handover to Wrong Cell and the second type of Too Late Handover are common in that a UE experienced RLF in the source cell and then attempts to re-establish an RRC connection to a cell to which the handover has not taken place.

In the second type of Too Late Handover described above, an RLF INDICATION message is sent on the X2 link from the eNB controlling the other cell, which is neither the source cell nor the target cell, to the eNB controlling the source cell. This RLF INDICATION message contains the PCI of the failure cell (i.e., the source cell) where the UE has experienced the RLF, and the ECGI of the re-establishment cell (i.e., the other cell) where the UE has attempted to re-establish the RRC connection. Also in the second type of Handover to Wrong Cell described above, a RLF INDICATION message similar to one transmitted in the second type of Too Late Handover is sent from the eNB controlling the other cell to the eNB controlling the source cell.

In the first type of Handover to Wrong Cell described above, an RLF INDICATION message is sent from the eNB controlling the other cell to the eNB controlling the target cell, and a HANDOVER REPORT message is sent from the eNB controlling the target cell to the eNB controlling the source cell. This RLF INDICATION message indicates the PCI of the target cell as the failure cell, and the ECGI of the other cell as the re-establishment cell. This HANDOVER REPORT message indicates the type of the handover failure (i.e., Handover to Wrong Cell in this case), the ECGI of the source cell, the ECGI of the target cell as the failure cell, and the ECGI of the other cell as the re-establishment cell. The conditions for sending the RLF INDICATION message and the HANDOVER REPORT message are described in Section 22.4.2 of Non-Patent Literature 1. The details of the contexts of the RLF INDICATION message and the HANDOVER REPORT message are described in Section 9.1.2.18 and Section 9.1.2.19 of Non-Patent Literature 2.

Handover optimization or Mobility Robustness Optimization (MRO) is a technique in which the base station of the source cell adjusts handover parameters in response to reception of the RLF INDICATION message or HANDOVER REPORT message in order to reduce handover failures. The handover parameters include, for example, Cell Individual Offset (CIO) acting on radio quality of a neighbour cell, Qoffset acting on radio quality of a neighbour cell, a3-offset acting on radio quality of the source cell, and Time to Trigger (TTT) for controlling the time to initiate handover.

It should be noted herein that, in the second type of Too Late Handover and the first and second types of Handover to Wrong Cell described above, there is a possibility that the NRs (i.e., NRT) of the source cell do not contain the entry of the other cell (re-establishment cell), to which the UE attempts to re-establish the RRC connection. However, it is not assumed that the execution of the ANR function is triggered by reception of the RLF INDICATION message or HANDOVER REPORT message, that is, by detection of handover failure. Accordingly, the eNB of the source cell cannot add a new NR from the source cell to another cell (re-establishment cell) to the NRs (i.e., NRT) of the source cell. Thus, there is a possibility that updating of the NRs of the source cell (i.e., addition of a new NR) may take a lot of time.

Further, the MRO is generally executed on the NRs of the source cell contained in the NRT. This is because a neighbour cell list (NCL) sent from an eNB to a UE is all or a subset of the NRs contained in the NRT. In some implementations, each neighbour cell contained in the NCL is subjected to a measurement report by a UE in RRC_CONNECTED, and may be designated as the target cell for handover of the UE. Accordingly, the handover parameter optimization is not performed on cells which are not contained in the NRs of the source cell. Thus, the inability to execute the ANR function in response to detection of a handover failure may cause a delay in handover improvement by the MRO.

In view of above, an object to be attained by exemplary embodiments disclosed herein is to provide a control apparatus, a base station apparatus, a method, and a program which contribute to updating neighbour-cell relations (NRs) in response to detection of a handover failure. It should be noted that this object is only one of the objects to be attained by exemplary embodiments disclosed herein. Other objects or problems and novel features will be made apparent from the following description and the accompanying drawings.

Solution to Problem

In an aspect, a control apparatus includes a memory and a processor. The memory can store a neighbour relation table including a plurality of entries indicating neighbour-cell relations from a source cell to respective neighbour cells. The processor is configured to automatically update the neighbour relation table. The processor is further configured to add, to the neighbour relation table, a new entry indicating a neighbour-cell relation from the source cell to another cell different from both the source cell and a target cell of a handover from the source cell, in response to receiving a first message that is issued when a radio terminal that has experienced a failure involving disconnection of a radio link connection in the source cell or in the target cell attempts to re-establish the radio link connection to the other cell.

In an aspect, a base station apparatus includes a communication interface and a processor. The communication interface is used to communicate between the base station apparatus and other base stations or between the base station apparatus and a core network node. The processor is configured to control establishment of a radio link connection used to communicate between the base station apparatus and a radio terminal. The processor is further configured to send a first message to a first base station controlling a first cell, via the communication interface, when the radio terminal that has experienced a failure involving disconnection of a radio link connection in the first cell or in a second cell which is a target cell of a first handover from the first cell attempts to re-establish the radio link connection to a third cell different from both the first and second cells. The first message contains at least a Physical Cell Identifier (PCI) of the third cell.

In an aspect, a radio terminal includes a wireless transceiver and a processor. The processor is configured to control establishment of a radio link connection used to communicate between the radio terminal and a base station via the wireless transceiver. The processor is further configured to:

(a) when the radio terminal has experienced a failure involving disconnection of the radio link connection in a target cell of a handover from a source cell after completion of the handover or during the handover, transmit a re-establishment request message for requesting re-establishment of the radio link connection to another cell different from both the source and target cells;

(b) perform an establishment procedure of a new radio link connection with a base station controlling the other cell in response to receiving, from the base station controlling the other cell, a reject message indicating rejection of the re-establishment request message; and (c) transmit to the base station controlling the other cell, during or following the establishment procedure, a first message containing at least a Physical Cell Identifier (PCI) of the source cell.

In an aspect, a method for updating a neighbour relation table includes adding, to a neighbour relation table of a base station controlling a source cell, a new entry indicating a neighbour-cell relation from the source cell to another cell different from both the source cell and a target cell of a handover from the source cell, in response to receiving a first message that is issued when a radio terminal that has experienced a failure involving disconnection of a radio link connection in the source cell or in the target cell attempts to re-establish the radio link connection to the other cell.

In an aspect, a control method that is performed by a base station includes sending a first message to a first base station controlling a first cell when a radio terminal that has experienced a failure involving disconnection of a radio link connection in the first cell or in a second cell which is a target cell of a first handover from the first cell attempts to re-establish the radio link connection to a third cell different from both the first and second cells. The first message contains at least a Physical Cell Identifier (PCI) of the third cell.

In an aspect, a control method that is performed by a radio terminal includes:

(a) when the radio terminal has experienced a failure involving disconnection of a radio link connection in a target cell of a handover from a source cell after completion of the handover or during the handover, transmitting a re-establishment request message for requesting re-establishment of a radio link connection to another cell different from both the source and target cells;

(b) performing an establishment procedure of a new radio link connection with a base station controlling the other cell in response to receiving, from the base station controlling the other cell, a reject message indicating rejection of the re-establishment request message; and (c) transmitting to the base station controlling the other cell, during or following the establishment procedure, a first message containing at least one of an E-UTRAN Cell Global Identifier (ECGI), a Physical Cell Identifier (PCI), a Tracking Area Code (TAC), and a EUTRA Absolute Radio Frequency Channel Number (EARFCN) of the source cell.

In an aspect, a program includes a set of instructions (software code) which, when loaded into a computer, causes the computer to perform one of the above-described methods.

Advantageous Effects of Invention

According to the aspects described above, it is possible to provide a control apparatus, a base station apparatus, a method, and a program which contribute to updating neighbour-cell relations (NRs) in response to detection of a handover failure.

BRIEF DESCRIPTION OF DRAWINGS

FIG. 2 is a table showing a specific example of a neighbour relation table (NRT);

FIG. 5 is a diagram showing a specific example of a modified RLF INDICATION message according to the first exemplary embodiment;

FIG. 6 is a table showing a specific example of a neighbour relation table (NRT) according to the first exemplary embodiment;

FIG. 17B is a sequence diagram showing an example of the control procedure according to the fifth exemplary embodiment;

FIG. 18 is a diagram showing a specific example of a modified HANDOVER REPORT message according to the fifth exemplary embodiment;

FIG. 19C is a sequence diagram showing an example of the control procedure according to the sixth exemplary embodiment.

DESCRIPTION OF EMBODIMENTS

Figure 1:
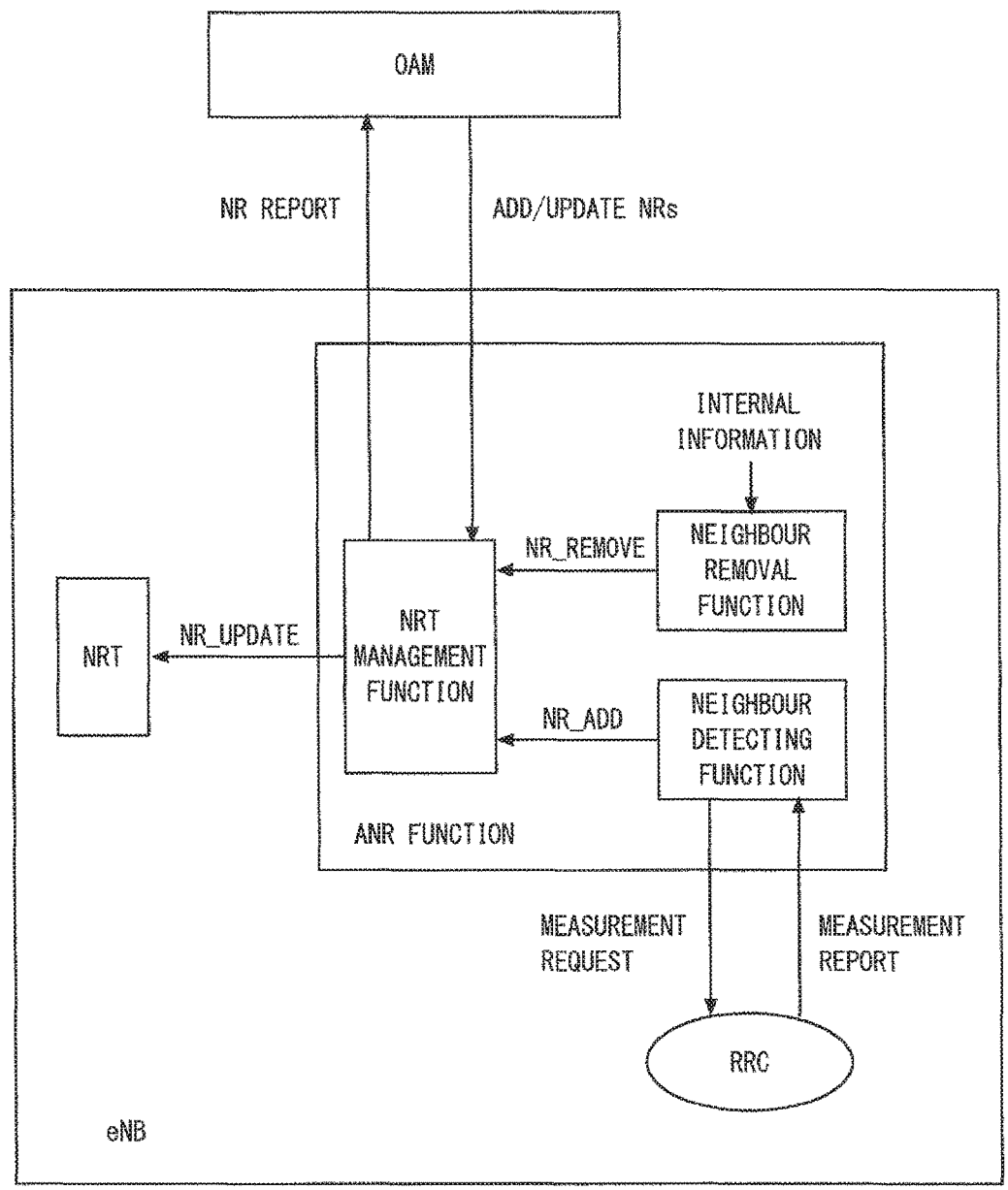
FIG. 1 is a diagram showing a plurality of elements included in an Automatic Neighbour Relation (ANR) function.

Specific exemplary embodiments will be described in detail below with reference to the drawings. In the drawings, the same or corresponding elements are denoted by the same reference symbols, and repeated descriptions thereof are omitted as needed for clarity of the explanation.

Exemplary embodiments described below can be carried out separately or in combination. These exemplary embodiments have different novel features. Accordingly, these exemplary embodiments contribute to attaining different objects or solving different problems, and also contribute to providing different advantageous effects.

First Exemplary Embodiment

Figure 3:
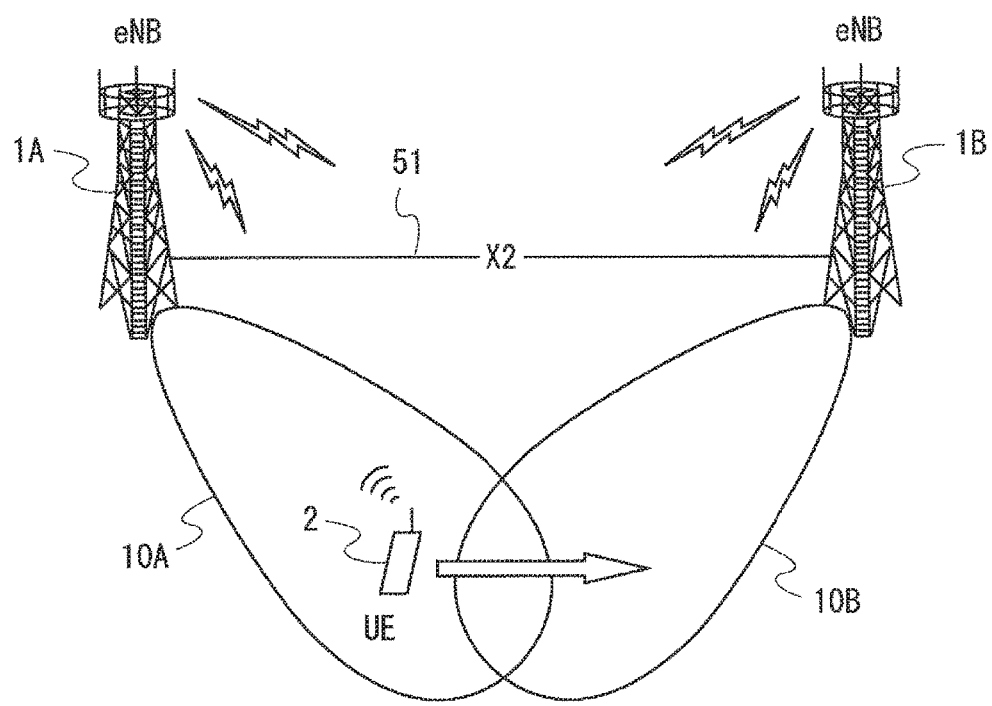
FIG. 3 is a diagram showing a configuration example of a radio communication system according to a first exemplary embodiment.

FIG. 3 shows a configuration example of a radio communication system according to this exemplary embodiment. The radio communication system provides communication services, such as voice communication or packet data communication or both, for example. Referring to FIG. 3, the radio communication system includes base stations 1A and 1B and a radio terminal 2. This exemplary embodiment is described based on the assumption that the radio communication system is an LTE system or an LTE-Advanced system. Specifically, the base stations 1A and 1B corresponds to eNBs, and the radio terminal 2 corresponds to a UE.

The eNBs 1A and 1B control cells 10A and 10B, respectively. The eNBs 1A and 1B establish an inter-base-station communication interface, i.e., an X2 interface (X2 link) 51, and thus can communicate with each other via the X2 interface 51.

Figure 4:
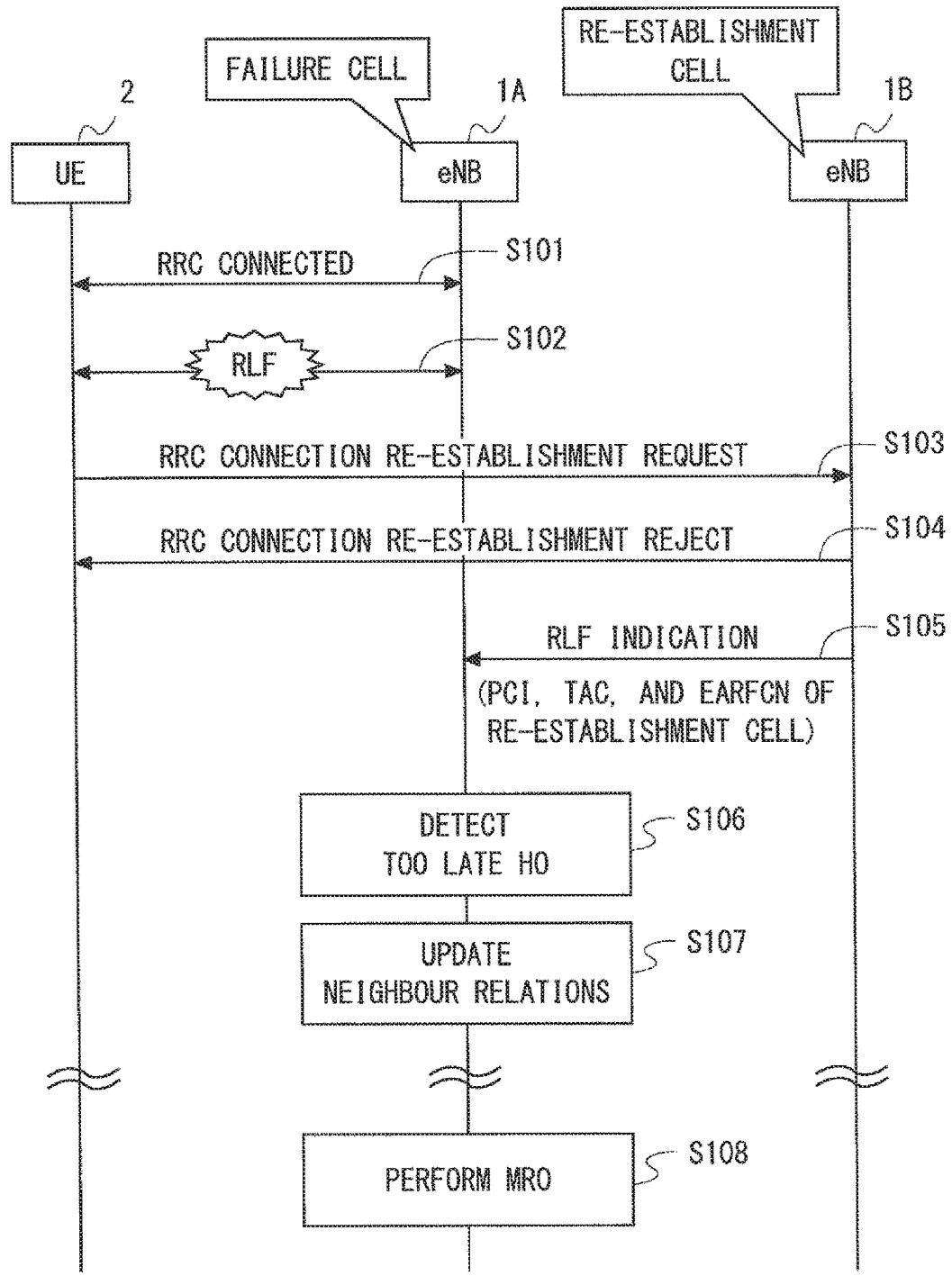
FIG. 4 is a sequence diagram showing an example of a control procedure according to the first exemplary embodiment.

The eNB 1A has a modified ANR function. The eNB 1B may also have an ANR function similar to that of the eNB 1A. The modified ANR function of the eNB 1A is described below with reference to FIG. 4. FIG. 4 is related to the second type of Too Late Handover described above and shows a case where the UE 2 moves from the cell 10A toward the cell 10B.

First, in step S101, the UE 2 establishes an RRC connection in the cell 10A of the eNB 1A. In other words, the UE 2 is in RRC_CONNECTED in the cell 10A.

The definitions of the terms "RRC connection" and "radio link connection" used herein are given below. The RRC connection is an example of a radio link connection. The RRC connection is used to transmit and receive control messages regarding the RRC protocol between a UE and an eNB. The RRC connection includes a Signaling Radio Bearer (SRG) for transmitting and receiving UE-dedicated control messages (i.e., RRC messages and Non-Access Stratum (NAS) messages).

The establishment of the RRC connection indicates a state in which at least an SRB for transmitting and receiving UE-dedicated control messages (i.e., Signalling Radio Bearer 1 (SRB1)) is established. RRC_CONNECTED indicates a state in which the UE has established the RRC connection. The eNB holds information (UE context) regarding the UE in RRC_CONNECTED. The location of the UE in RRC_CONNECTED is tracked by the core network (EPC) at cell level or eNB level. In most cases, the UE in RRC_CONNECTED can perform unicast data transmission to and from the eNB. On the other hand, RRC_IDLE indicates a state in which the UE has released the RRC connection. The eNB has no information (UE context) relating to the UE in RRC_IDLE. The location of the UE in RRC_IDLE is tracked by the EPC at tracking-area level. The EPC can reach the UE in RRC_IDLE by paging. The UE in RRC_IDLE cannot perform unicast data transmission to or from the eNB. Accordingly, the UE in RRC_IDLE has to transition to RRC_CONNECTED to perform unicast data transmission.

Referring to FIG. 4 again, the description is continued. In step S102, the UE 2 moves toward the cell 10B. However, the neighbour-cell relations (NRs) of the cell 10A or the NRT in the eNB 1A do not include an entry regarding the cell 10B. Accordingly, handover of the UE 2 from the cell 10A of the eNB 1A to the cell 10B of the eNB 1B is not initiated. Consequently, the UE 2 experiences RLF involving disconnection of the RRC connection in the cell 10A.

In step S103, the UE 2 detects the cell 10B and attempts re-establishment of the RRC connection to the cell 10B. Specifically, the UE 2 transmits an RRC Connection Re-establishment Request message to the eNB 1B of the cell 10B. Note that in FIG. 4, the illustration of a random access procedure involving transmission of a Physical Random Access Channel (PRACH) preamble that is performed prior to transmission of the RRC Connection Re-establishment Request message is omitted.

The RRC Re-establishment Request message transmitted in step S103 indicates "other failure" as a reestablishment Cause. The "other failure" corresponds to, for example, "Radio Link Failure". The RRC Connection Re-establishment Request message contains a Physical Cell Identity (PCI) of the cell 10A, a Cell Radio Network Temporary Identifier (C-RNTI) assigned to the UE 2 in the cell 10A, and shortMAC-I for a security algorithm. As described above, the PCI is a number from 0 to 503 and is an identifier for distinguishing a cell from its neighbour cells. The PCI is repeatedly used in a frequency band. The C-RNTI is a temporary identifier unique within a cell, and is used to perform a dedicated transmission to each UE. The shortMAC-I is used to specify and authenticate a UE in the RRC Connection Re-establishment. The shortMAC-I corresponds to the 16 least significant bits of the Message Authentication Code for data Integrity (MAC-I) and is calculated using the security configuration in a cell to which the UE was most recently connected.

The RRC CONNECTION RE-ESTABLISHMENT procedure is initiated by the RRC Connection Re-establishment Request message and is carried out for the purpose of re-establishment of the most recently disconnected RRC connection that has most recently been disconnected. The re-establishment of the RRC connection involves resumption of the SRB1 and re-activation of the security algorithm. However, the RRC CONNECTION RE-ESTABLISHMENT procedure is successful only if the eNB that has received the RRC Connection Re-establishment Request message has the valid UE context.

In the case of FIG. 4, the eNB 1B does not have the valid UE context of the UE 2. This is because, handover from the cell 10A to the cell 10B has not been initiated and thus the eNB 1B has not received the valid UE context of the UE 2 from the eNB 1A. Accordingly, in step S104, the eNB 1B transmits an RRC Connection Re-establishment Reject message. The UE 2 transitions to RRC_IDLE in response to the RRC Connection Re-establishment Reject message. Although not shown in FIG. 4, after step S103, the UE 2 may initiate an RRC CONNECTION ESTABLISHMENT procedure involving transmission of an RRC Connection Request message to the eNB 1B in order to establish a new RRC connection.

The eNB 1A corresponds to a failure cell where the UE 2 has experienced the RLF. The eNB 1B corresponds to a re-establishment cell where the UE 2 has attempted the RRC Connection Re-establishment. Accordingly, in step S105, the eNB 1B sends an RLF INDICATION message via the X2 interface 51. The RLF INDICATION message indicates that the UE 2 has attempted to re-establish the RRC connection to the cell 10B after the UE 2 has experienced the RLF involving disconnection of the RRC connection in the cell 10A.

Further, the RLF INDICATION message sent in step S105 is modified so as to include additional information elements (IEs). Specifically, the modified RLF INDICATION message contains the PCI of the re-establishment cell (i.e., the cell 10B). The modified RLF INDICATION message may contain one or both of the TAC and EUTRA Absolute Radio Frequency Channel Number (EARFCN) of the re-establishment cell (cell 10B). The EARFCN is a number from 0 to 65535, which are associated in one-to-one correspondence with carrier frequencies used in the LTE. The PCI, TAC, and EARFCN of the re-establishment cell (cell 10B) are known by the eNB 1B that controls the re-establishment cell (cell 10B) and issues the RLF INDICATION message.

FIG. 5 shows a specific example of the modified RLF INDICATION message. In the example shown in FIG. 5, the modified RLF INDICATION message includes information elements (IEs) indicating the PCI, TAC, and EARFCN of the re-establishment cell (cell 10B). In the example shown in FIG. 5, the presence of these additional information elements (IE) is represented by "Optional (O)", but may instead be represented by any other value, i.e., "Mandatory (M)" or "Conditional (C)".

Referring to FIG. 4 again, the description is continued. In step S106, the eNB 1A detects Too Late Handover based on the reception of the RLF INDICATION message from the eNB 1B. The eNB 1A stores the detected Too Late Handover in a memory (not shown) as handover failure history information.

In step S107, the eNB 1A performs the ANR including updating of the neighbour-cell relations (NRs) of the cell 10A in response to receiving the RLF INDICATION message, which indicates that the UE 2 has attempted to re-establish the RRC connection to the cell 10B after the UE 2 has experienced RLF involving disconnection of the RRC connection in the cell 10A. In other words, the eNB 1A updates the NRs of the cell 10A in response to detection of Too Late Handover corresponding to the occurrence of the RLF of the UE 2 in the cell 10A without initiating an outbound handover from the cell 10A. Specifically, the eNB 1A adds, to the NRT of the cell 10A, a new neighbour relation (NR) from the cell 10A to the cell 10B.

FIG. 6 shows an example of the NRT of the cell 10A that has been updated by the ANR operation in step S107. The NRT 40 shown in FIG. 6 includes a new entry 41 regarding the NR from the cell 10A to the cell 10B. It should be noted herein that the TCI (i.e., ECGI and PCI) of the cell 10B contained in the entry 41 is obtained from the information elements (IEs) contained in the modified RLF INDICATION message received from the eNB 1B. The ECGI of the cell 10B as the re-establishment cell is also contained in the existing RLF INDICATION message. However, the PCI of the cell 10B as the re-establishment cell is one of the new information elements (IEs) included in the modified RLF INDICATION message according to this exemplary embodiment as shown in the specific example of FIG. 5. Further, as shown in FIG. 6, the entry 41 may contain the EARFCN and TAC of the cell 10B within the NR. These EARFCN and TAC can also be obtained from the new information elements (IEs) contained in the modified RLF INDICATION message according to this exemplary embodiment as shown in the specific example of FIG. 5.

Referring to FIG. 4 again, the description is continued. The order of steps S106 and S107 described above is not particularly limited. The process in step S107 can be executed independently from the process in step S106. The ANR process in step S107 may be performed prior to the process in step S106, or may be performed in parallel with the process in step S106.

In step S108, the eNB 1A performs MRO for the cell 10A including optimization of handover parameters by using the stored handover failure history information. Prior to this MRO, the NR from the cell 10A to the cell 10B has been added in step S107. Accordingly, the eNB 1A can perform the MRO on handover parameters relating to handovers from the cell 10A to the cell 10B.

The sequence shown in FIG. 4 is merely an example and may be modified as needed. For example, the PCI, TAC, EARFCN, and the like of the re-establishment cell (i.e., the cell 10B) may be sent using any other X2 application protocol (X2AP) message different from the RLF INDICATION message. For example, the eNB 1A may receive from the eNB 1B an RLF INDICATION message which is the same as the existing one (i.e., the RLF INDICATION message not including the PCI, TAC, and EARFCN of the re-establishment cell), determine that the NRT of the cell 10A does not include a NR corresponding to the ECGI of the re-establishment cell (cell 10B) contained in this RLF INDICATION message, and send to the eNB 1B an X2AP message for requesting transmission of the PCI or the like of the re-establishment cell (cell 10B). The eNB 1B may send to the eNB 1A an X2AP message indicating the PCI or the like of the re-establishment cell (cell 10B) in response to the request from the eNB 1A. Alternatively, the eNB 1A may request a UE camped on the cell 10A to send the PCI or the like of the re-establishment cell (cell 10B). Other modified examples thereof are described in exemplary embodiments described later.

Figure 7:
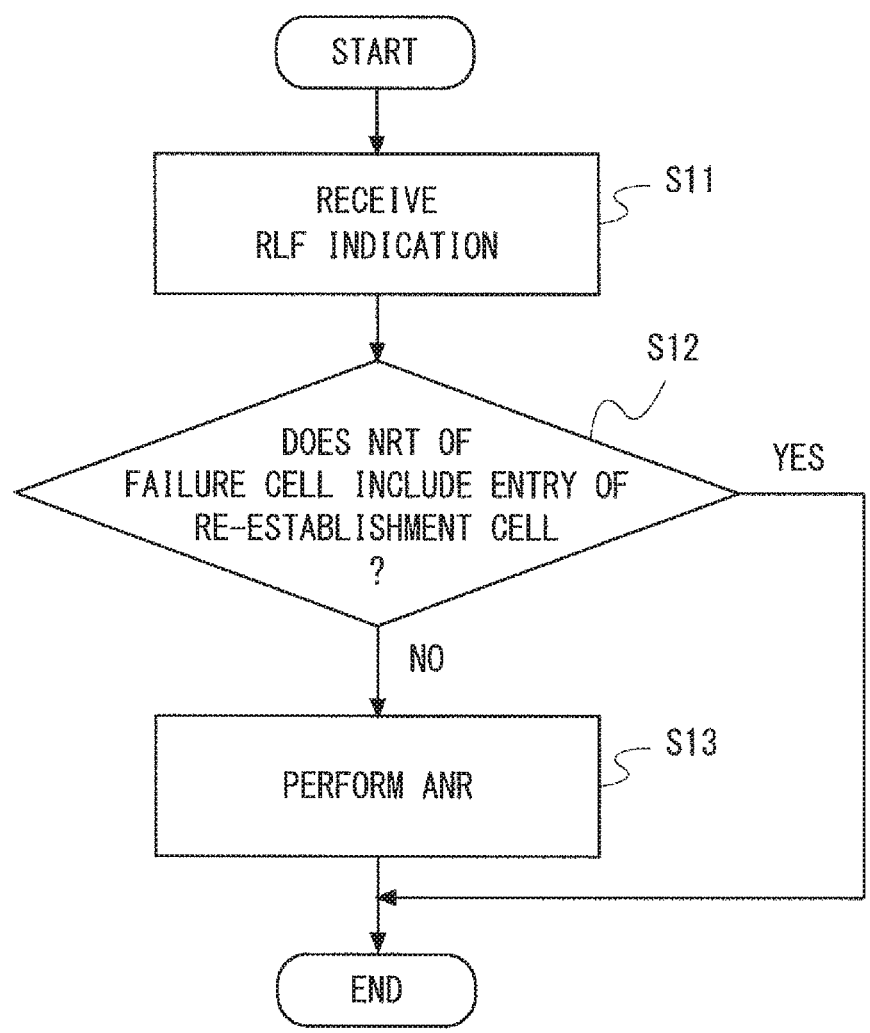
FIG. 7 is a flowchart showing an example of a control method performed by an eNB according to the first exemplary embodiment.

FIG. 7 is a flowchart showing an example of a control procedure carried out by the eNB 1A. In step S11, the eNB 1A receives the RLF INDICATION message from the eNB 1B via the X2 interface 51. In step S12, the eNB 1A checks whether the NRs of the failure cell (i.e., the cell 10A) include a NR regarding the re-establishment cell (i.e., the cell 10B). Specifically, the eNB 1A may check whether the NRT of the failure cell (cell 10A) includes the entry indicating the ECGI of the re-establishment cell (cell 10B) contained in the received RLF INDICATION message. When the NRs of the failure cell (cell 10A) do not include a NR regarding the re-establishment cell (cell 10B) (NO in step S12), the eNB 1A executes the ANR operation including adding a NR from the cell 10A to the cell 10B to the NRs (NRT) of the cell 10A.

Figure 8:
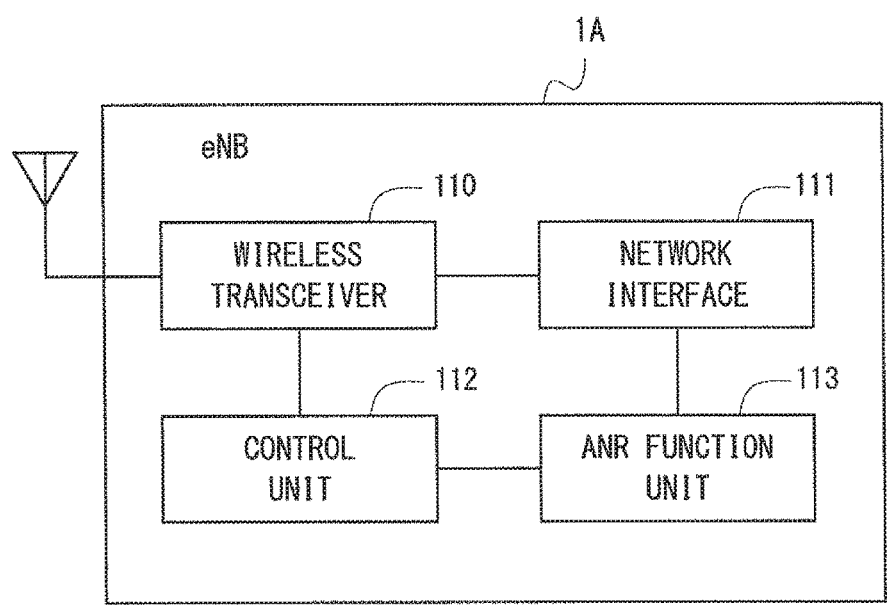
FIG. 8 is a diagram showing a configuration example of the eNB according to the first exemplary embodiment.

Configuration examples of the eNB 1A according to this exemplary embodiment are described below. FIG. 8 shows a configuration example of the eNB 1A. Referring to FIG. 8, the eNB 1A includes a wireless transceiver 110, a network interface 111, a control unit 112, and an ANR function unit 113. The wireless transceiver 110 is configured to communicate with the UE 2. The network interface 111 is used to communicate with other base stations including the eNB 1B, a core network node (e.g., MME), an OAM, and the like. The network interface 111 may include, for example, a network interface card (NIC) conforming to IEEE 802.3 series. The control unit 112 performs communication control including the RRC and Radio Resource Management (RRM). For example, the control unit 112 performs the RRC including establishment of an RRC connection with the UE 2, establishment of a data radio bearer for the UE 2, broadcasting of system information, and paging of the UE 2. The ANR function unit 113 performs the ANR operation of the eNB 1A described in this exemplary embodiment.

Figure 9:
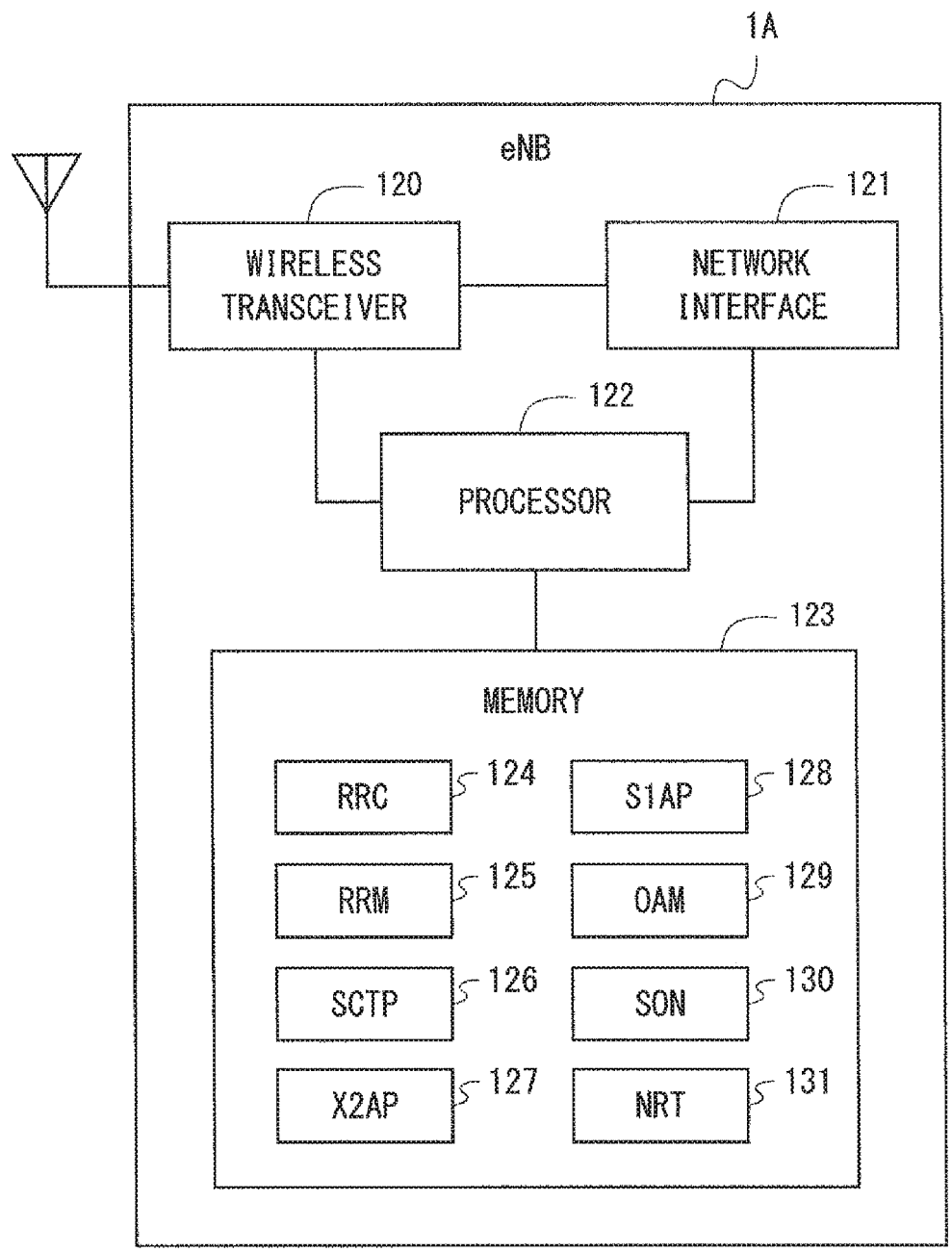
FIG. 9 is another configuration example of the eNB according to the first exemplary embodiment.

FIG. 9 shows another configuration example of the eNB 1A. Referring to FIG. 9, the eNB 1A includes a wireless transceiver 120, a network interface 121, a processor 122, and a memory 123. The wireless transceiver 120 is configured to communicate with the UE 2. The network interface 121 is used to communicate with other base stations including the eNB 1B, a core network node (e.g., MME), an OAM, and the like.

The processor 122 loads software (computer program) from the memory 123 and executes the loaded software, thereby performing communication control including the RRC, the RRM, and the ANR operation of the eNB 1A described in this exemplary embodiment. The processor 122 may be, for example, a microprocessor, a Micro Processing Unit (MPU), or a Central Processing Unit (CPU). The processor 122 may include a plurality of processors.

The memory 123 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), a Programmable ROM (PROM), a flash memory, a hard disk drive, or a combination thereof. The memory 123 may include a storage disposed at a location apart from the processor 122. In this case, the processor 122 may access the memory 123 via the network interface 121 or another I/O interface (not shown).

In the example shown in FIG. 9, the memory 123 is used to store software modules including an RRC module 124, an RRM module 125, a Stream Control Transmission Protocol (SCTP) module 126, an X2 application protocol (X2AP) module 127, an S1 application protocol (S1AP) module 128, an Operation and Maintenance (OAM) module 129, and a Self-Organizing Network (SON) module 130. The SON module 130 includes a set of instructions and data for executing the SON functions including the ANR function and the MRO. The processor 122 can perform the ANR operation of the eNB 1A described in this exemplary embodiment by loading the SON module 130 from the memory 123 and executing the loaded SON module. Further, in the example shown in FIG. 9, the memory 123 is used to store a Neighbour Relation Table (NRT) 131. The NRT 131 is updated by the processor 122 that performs the ANR operation.

Figure 10:
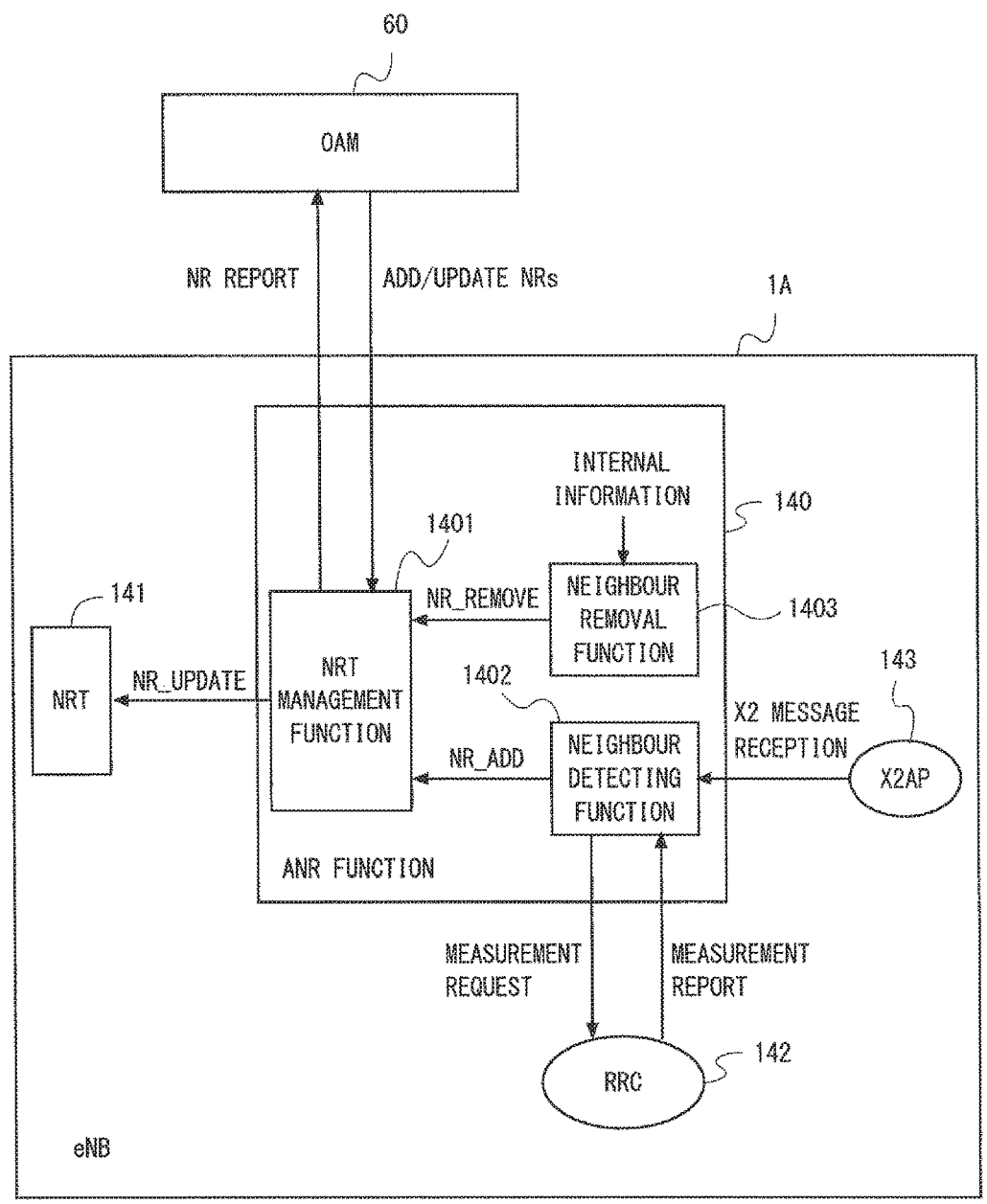
FIG. 10 is a diagram showing still another configuration example of the eNB according to the first exemplary embodiment.

FIG. 10 shows still another configuration example of the eNB 1A. Referring to FIG. 10, the eNB 1A includes an ANR function 140, an RRC function 142, and an X2AP function 143. The ANR function 140 includes an NRT management function 1401, a neighbour detection function 1402, and a neighbour removal function 1403. The NRT management function 1401 manages a conceptual NRT 141. The NRT management function 1401 may communicate with an OAM 60. The neighbour detection function 1402 finds a new neighbour cell based on a measurement report received from a UE by the RRC function 142, and adds a NR corresponding to this new neighbour cell to the NRT 141. Further, the neighbour detection function 1402 finds a new neighbour cell based on an X2 message (e.g., RLF INDICATION message) received from the eNB 1B via the X2 interface (X2 link) 51 by the X2AP function 143, and adds a NR corresponding to this new neighbour cell to the NRT 141. The neighbour removal function 143 removes unnecessary NRs from the NRT 141. Each of the ANR function 140, the RRC function 142, and the X2AP function 143 may be implemented by software, or by hardware, or by a combination of software and hardware.

The configuration of the eNB 1B may be the same as the configuration of the eNB 1A described above. The control unit 112, ANR function unit 113, or processor 122 of the eNB 1B may operate to send, to the eNB 1A controlling the failure cell (cell 10A), an X2AP message (e.g., the modified RLF INDICATION message described above) indicating the PCI, TAC, EARFCN, or the like of the cell 10B, which is the re-establishment cell. The ANR function unit 113 of the eNB 1B may have an ANR function similar to that of the eNB 1A described in this exemplary embodiment.

As can be understood from the above, the eNB 1A according to this exemplary embodiment can update the neighbour-cell relations (NRs) of the cell 10A in response to reception of the RLF INDICATION message indicating that the UE 2 has experienced RLF involving disconnection of the RRC connection in the cell 10A and has attempted to re-establish the RRC connection to the cell 10B. In other words, the NRs of the cell 10A can be updated in response to detection of Too Late Handover corresponding to the occurrence of RLF of the UE 2 in the cell 10A without initiating an outbound handover from the cell 10A.

Furthermore, according to the specific example of the modified RLF INDICATION message described above with reference to FIGS. 4 and 5 and the like, the eNB 1A can acquire the PCI or the like of the re-establishment cell (cell 10B) by receiving the RLF INDICATION message. Accordingly, there is no need to request the eNB 1B or the UE to send the PCI or the like of the re-establishment cell (cell 10B).

Second Exemplary Embodiment

This exemplary embodiment illustrates a modified example of the control procedure relating to the ANR operation described in the first exemplary embodiment. A configuration example of a radio communication system according to this exemplary embodiment may be the same as that shown in FIG. 3 described above in regard to the first exemplary embodiment. Configuration examples of the eNB 1A and the eNB 1B according to this exemplary embodiment may be the same as those shown in FIG. 8, FIG. 9, or FIG. 10.

Figure 11:
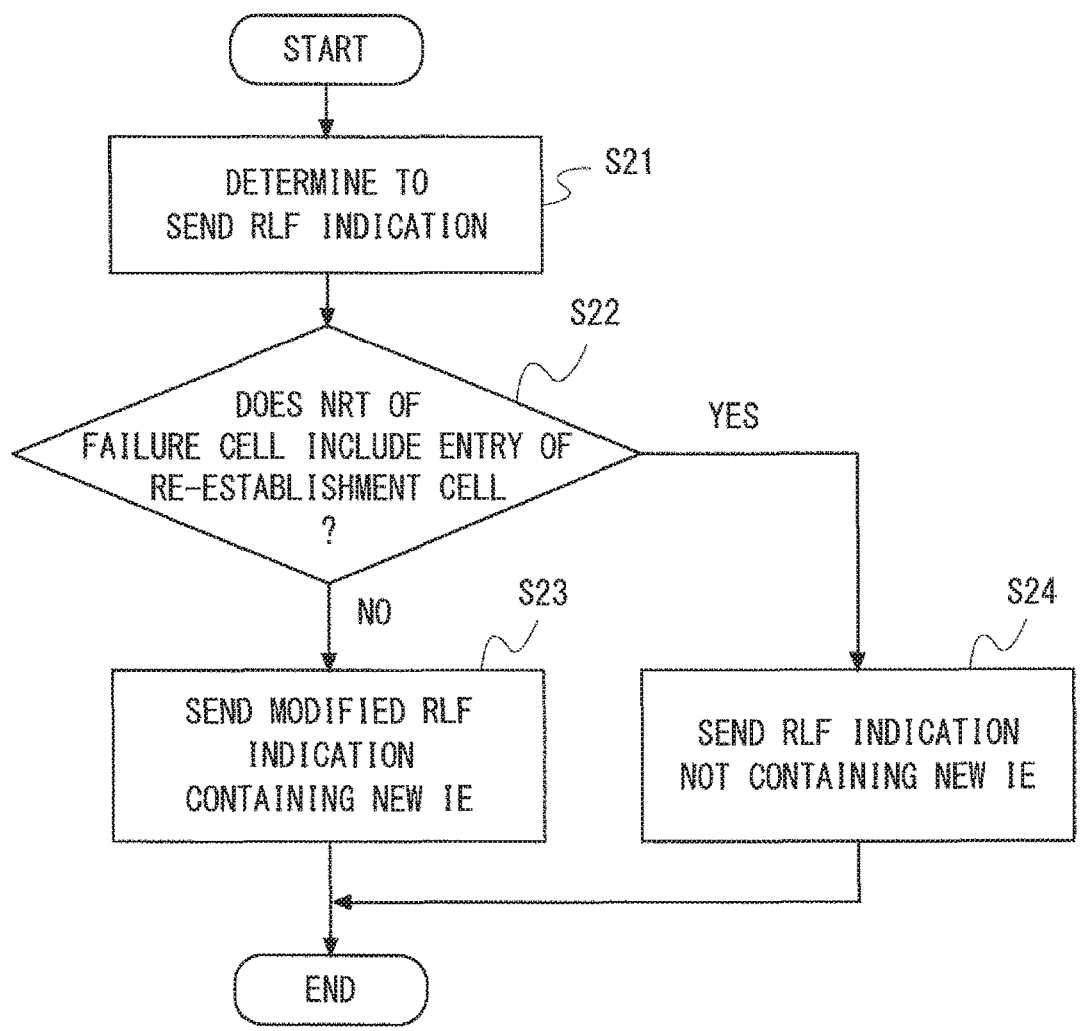
FIG. 11 is a flowchart showing an example of a control method performed by an eNB according to a second exemplary embodiment.

The first exemplary embodiment illustrates an example in which the eNB 1B controlling the re-establishment cell (cell 10B) sends the modified RLF INDICATION message to the eNB 1A controlling the failure cell (cell 10A). In this exemplary embodiment, the eNB 1B determines whether to send the modified RLF INDICATION message or the existing RLF INDICATION message (i.e., not including the PCI, TAC, and EARFCN of the re-establishment cell). FIG. 11 is a flowchart showing an example of the determination procedure of the eNB 1B.

In step S21, the eNB 1B determines to send an RLF INDICATION message. The eNB 1B may initiate an RLF INDICATION procedure involving transmission of an RLF INDICATION message, in accordance with normal conditions described in Non-Patent Literature 1. Specifically, the eNB 1B may initiate an RLF INDICATION procedure when the UE 2 has attempted to re-establish the radio link connection in the eNB 1B (cell 10B) after the occurrence of a failure (i.e., Radio Link Failure or Handover Failure) involving disconnection of the radio link connection (i.e., RRC connection) in the eNB 1A (cell 10A).

In step S22, the eNB 1B checks whether or not the NRs of the failure cell (i.e., the cell 10A) include a NR regarding the re-establishment cell (i.e., the cell 10B). Specifically, the eNB 1B may check whether the NRT of the failure cell (cell 10A) include an entry indicating the ECGI of the re-establishment cell (cell 10B). For this check, the eNB 1B may use information elements (IEs) contained in an X2AP message which has been previously received from the eNB 1A via the X2 interface 51. Specifically, the eNB 1B can use an X2 SETUP REQUEST message or X2 SETUP RESPONSE message from the eNB 1A during the establishment procedure of the X2 interface 51. Alternatively, the eNB 1B may use an ENB CONFIGURATION UPDATE message which has been previously received from the eNB 1A via the X2 interface 51. The ENB CONFIGURATION UPDATE message is sent by the eNB 1A in response to updating of the configuration information of the eNB 1A.

The X2 SETUP REQUEST message and the X2 SETUP RESPONSE message each include a Neighbour Information IE. The Neighbour Information IE indicates the ECGI, PCI, and EARFCN of each neighbour cell known by the eNB 1A. Similarly to the X2 SETUP REQUEST and RESPONSE messages, the ENB CONFIGURATION UPDATE message contains the Neighbour Information IE. The eNB 1B may refer to ECGIs contained in the Neighbour Information IE received from the eNB 1A and check whether the ECGI of the cell 10B is included in these ECGIs. The details of the X2 SETUP REQUEST, X2 SETUP RESPONSE, and ENB CONFIGURATION UPDATE messages are defined in Section 9.1.2.3, Section 9.1.2.4, and Section 9.1.2.8, respectively, of Non-Patent Literature 2.

When the NRs of the failure cell (cell 10A) do not include a NR regarding the re-establishment cell (cell 10B) (NO in step S22), the eNB 1B send the modified RLF INDICATION message containing new IE(s) that indicates the PCI or the like of the re-establishment cell (step S23). When the NRs of the failure cell (cell 10A) include a NR regarding the re-establishment cell (cell 10B) (YES in step S22), the eNB 1B sends the existing RLF INDICATION message not including the new IE(s) (step S24).

Figure 12:
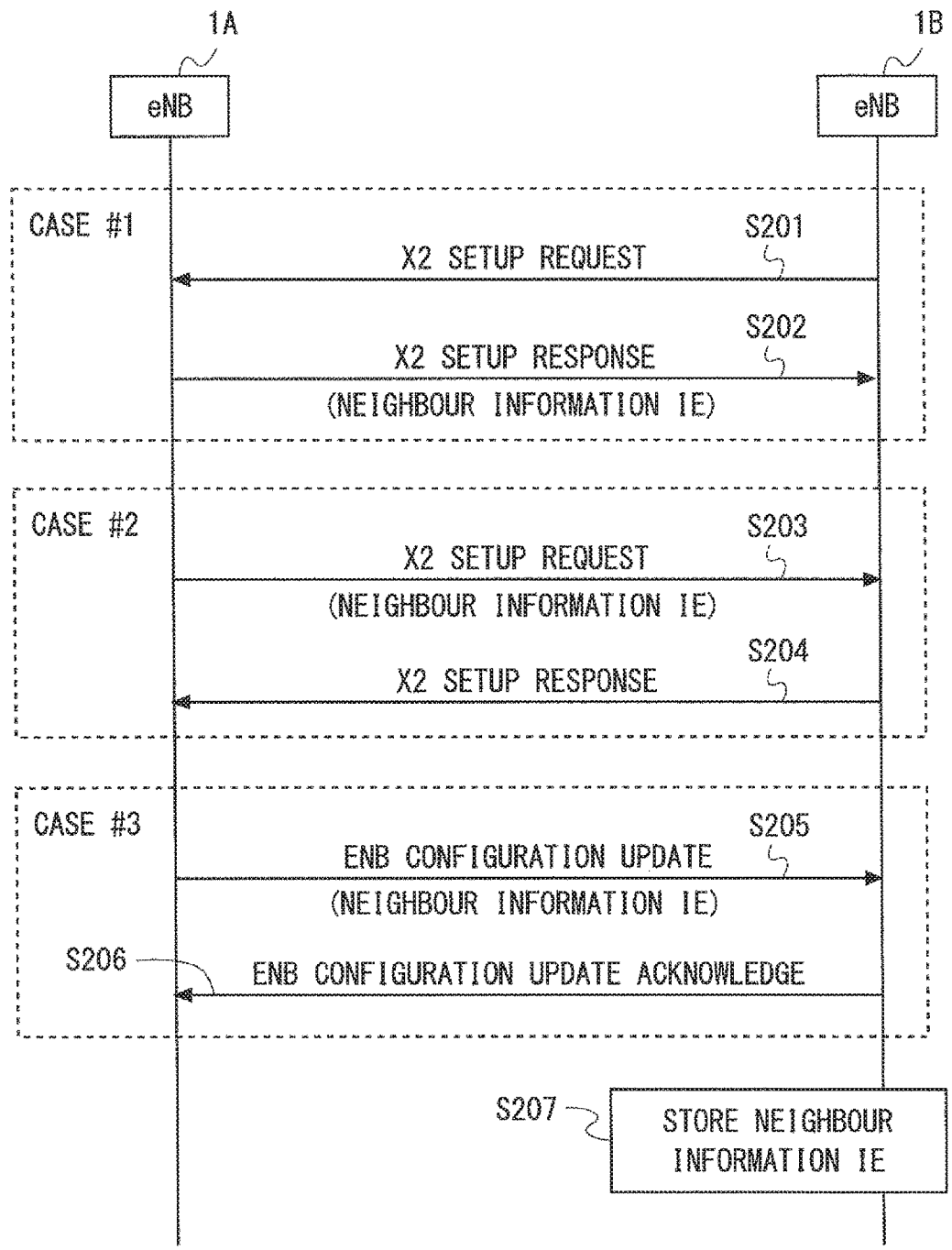
FIG. 12 is a sequence diagram showing an example of a control procedure according to the second exemplary embodiment.

FIG. 12 is a sequence diagram showing transmission of the X2 SETUP REQUEST, X2 SETUP RESPONSE, and ENB CONFIGURATION UPDATE messages. The procedure shown in FIG. 12 is performed prior to the procedure shown in FIG. 11. In a case #1, the eNB 1B sends the X2 SETUP REQUEST message (step S201), and the eNB 1A sends the X2 SETUP RESPONSE message (step S202). In a case #2, the eNB 1A sends the X2 SETUP REQUEST message (step S203), and the eNB 1B sends the X2 SETUP RESPONSE message (step S204). In a case #3, the eNB 1A sends the ENB CONFIGURATION UPDATE message (step S205), and the eNB 1B sends an ENB CONFIGURATION UPDATE ACKNOWLEDGE message (step S206). Each of the X2 SETUP RESPONSE message (step S202), the X2 SETUP REQUEST message (step S203), and the ENB CONFIGURATION UPDATE message (step S205) from the eNB 1A includes the Neighbour Information IE. In step S207, the eNB 1B stores the Neighbour Information IE received from the eNB 1A.

According to this exemplary embodiment, advantageous effects similar to those of the first exemplary embodiment may be achieved. Further, according to the procedure described above with reference to FIG. 11, when the new IE(s) indicating the PCI or the like of the re-establishment cell is not required in the eNB 1A, the eNB 1B sends the existing RLF INDICATION message, which does not include the new IE(s). Accordingly, this exemplary embodiment is advantageous in that transmission of redundant IE from the eNB 1B to the eNB 1A can be avoided.

Third Exemplary Embodiment

This exemplary embodiment illustrates a modified example of the control procedure relating to the ANR operation described in the first exemplary embodiment. A configuration example of a radio communication system according to this exemplary embodiment may be the same as that shown in FIG. 3 described above in regard to the first exemplary embodiment. Configuration examples of the eNB 1A and the eNB 1B according to this exemplary embodiment may be the same as those shown in FIG. 8, FIG. 9, or FIG. 10.

The first exemplary embodiment illustrates an example in which the eNB 1B controlling the re-establishment cell (cell 10B) sends the modified RLF INDICATION message to the eNB 1A controlling the failure cell (cell 10A). In this exemplary embodiment, the eNB 1B sends the existing RLF INDICATION message (i.e., not including the PCI, TAC, and EARFCN of the re-establishment cell). Accordingly, the eNB 1A acquires the PCI, TAC, EARFCN, or the like of the re-establishment cell by using other means. The eNB 1A may use information elements (IEs) contained in an X2AP message which has been previously received from the eNB 1A via the X2 interface 51.

Specifically, the eNB 1A can use an X2 SETUP REQUEST message or X2 SETUP RESPONSE message received from the eNB 1B during the establishment procedure of the X2 interface 51. The X2 SETUP REQUEST message and the X2 SETUP RESPONSE message each include a Served Cell Information IE. The Served Cell Information IE indicates the PCI, ECGI, and TAC of the cell 10B controlled by the eNB 1B, all broadcasted PLMN ID(s), EARFCN, and the like. Similarly to the X2 SETUP REQUEST and RESPONSE messages, the ENB CONFIGURATION UPDATE message contains the Served Cell Information IE. The eNB 1A may store the PCI, ECGI, TAC, and the like of the cell 10B contained in the Served Cell Information IE received from the eNB 1B. The details of the Served Cell Information IE are described in Section 9.2.8 of Non-Patent Literature 2.

Figure 13:
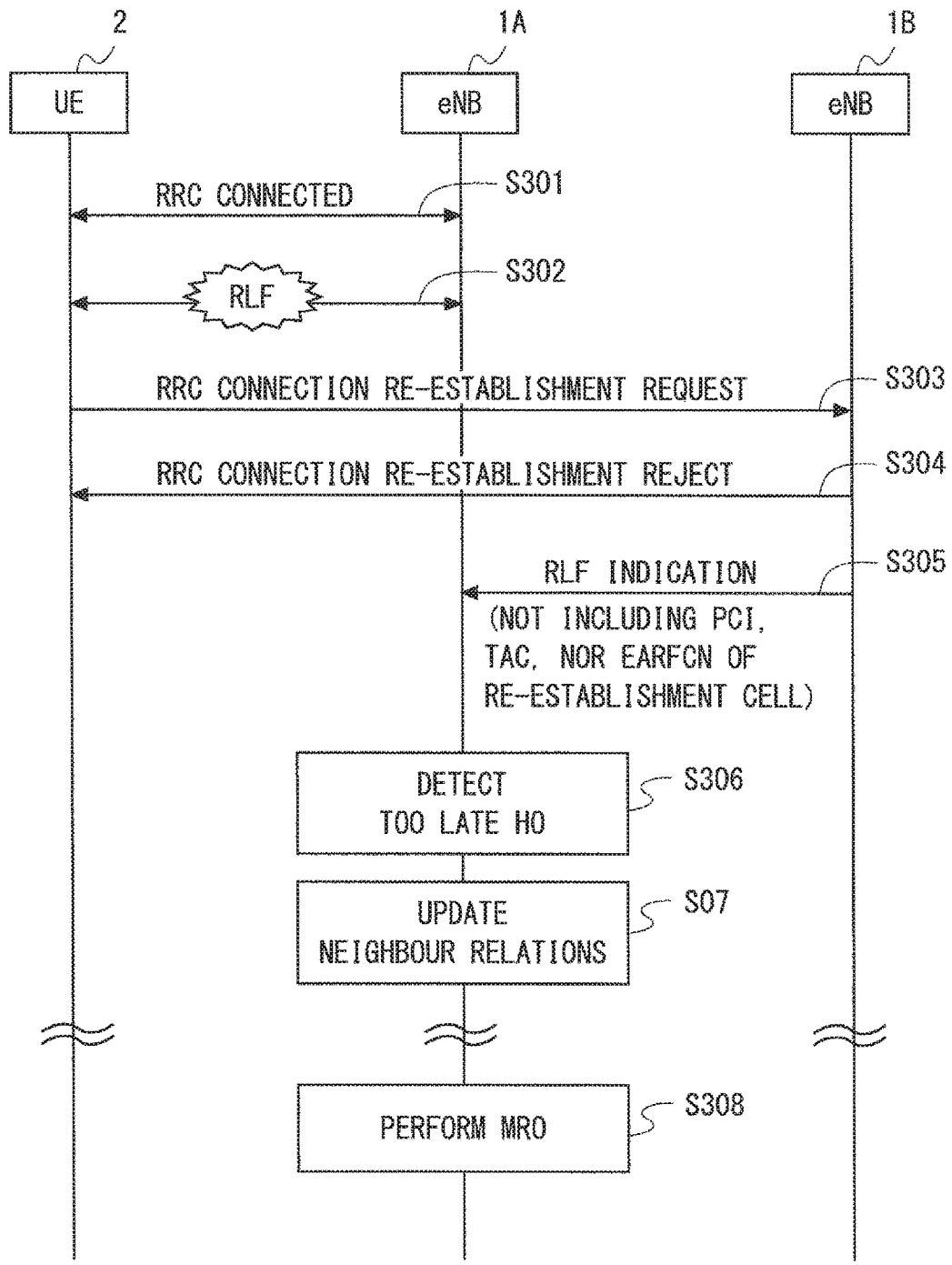
FIG. 13 is a sequence diagram showing an example of a control procedure according to a third exemplary embodiment.

FIG. 13 is a sequence diagram showing an example of the procedure of performing the ANR operation by the eNB 1A according to this exemplary embodiment. Similarly to FIG. 4 described above in the first exemplary embodiment, FIG. 13 is related to the second type of Too Late Handover and shows a case where the UE 2 moves from the cell 10A to the cell 10B.

The processes in steps S301 to S304 are similar to the processes in steps S101 to S104 shown in FIG. 4. In step S305, the eNB 1B sends an RLF INDICATION message to the eNB 1A. This RLF INDICATION message may be the same as the existing one (i.e., not including the PCI, TAC, and EARFCN of the re-establishment cell).

The process in step S306 is similar to the process in step S106 shown in FIG. 4. The process in step S307 is basically similar to the process in step S107 shown in FIG. 4. Specifically, the eNB 1A adds a new neighbour relation (NR) from the cell 10A to the cell 10B to the NRT of the cell 10A in response to reception of the RLF INDICATION message. However, the eNB 1A acquires the PCI, TAC, EARFCN, and the like, which are to be included in the new NR, from the Served Cell Information IE that has been previously received from the eNB 1B and is held by the eNB 1A.

The order of steps S306 and S307 is not particularly limited. The process in step S307 can be executed independently from the process in step S306. The process in step S308 is similar to the process in step S108 shown in FIG. 4.

Figure 14:
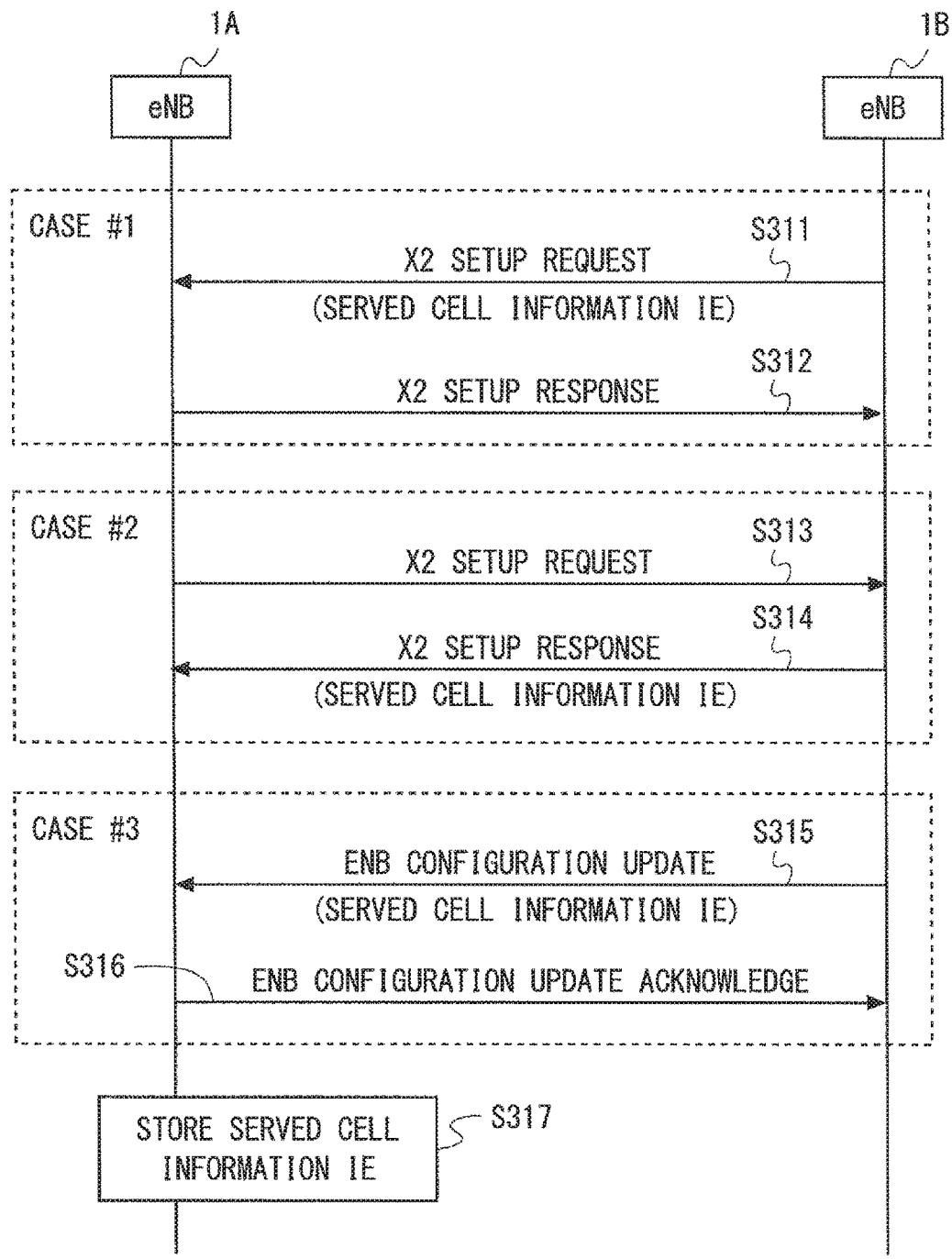
FIG. 14 is a sequence diagram showing an example of the control procedure according to the third exemplary embodiment.

FIG. 14 is a sequence diagram showing transmission of the X2 SETUP REQUEST, X2 SETUP RESPONSE, and ENB CONFIGURATION UPDATE messages. The procedure shown in FIG. 14 is performed prior to the procedure shown in FIG. 13. In the case #1, the eNB 1B sends the X2 SETUP REQUEST message (step S311), and the eNB 1A sends the X2 SETUP RESPONSE message (step S312). In the case #2, the eNB 1A sends the X2 SETUP REQUEST message (step S313), and the eNB 1B sends the X2 SETUP RESPONSE message (step S314). In the case #3, the eNB 1B sends the ENB CONFIGURATION UPDATE message (step S315), and the eNB 1A sends the ENB CONFIGURATION UPDATE ACKNOWLEDGE message (step S316). Each of the X2 SETUP REQUEST message (step S311), the X2 SETUP RESPONSE message (step S314), and the ENB CONFIGURATION UPDATE message (step S315) from the eNB 1B includes the Served Cell Information IE. In step S317, the eNB 1A stores the Served Cell Information IE received from the eNB 1B.

According to this exemplary embodiment, advantageous effects similar to those of the first exemplary embodiment may be achieved. Further, according to the procedure described above with reference to FIG. 13, the eNB 1B does not have to send the modified RLF INDICATION message containing the new IE(s) indicating the PCI or the like of the re-establishment cell. Accordingly, this exemplary embodiment is advantageous in that the existing RLF INDICATION message can be used with no modification.

Fourth Exemplary Embodiment

Figure 15:
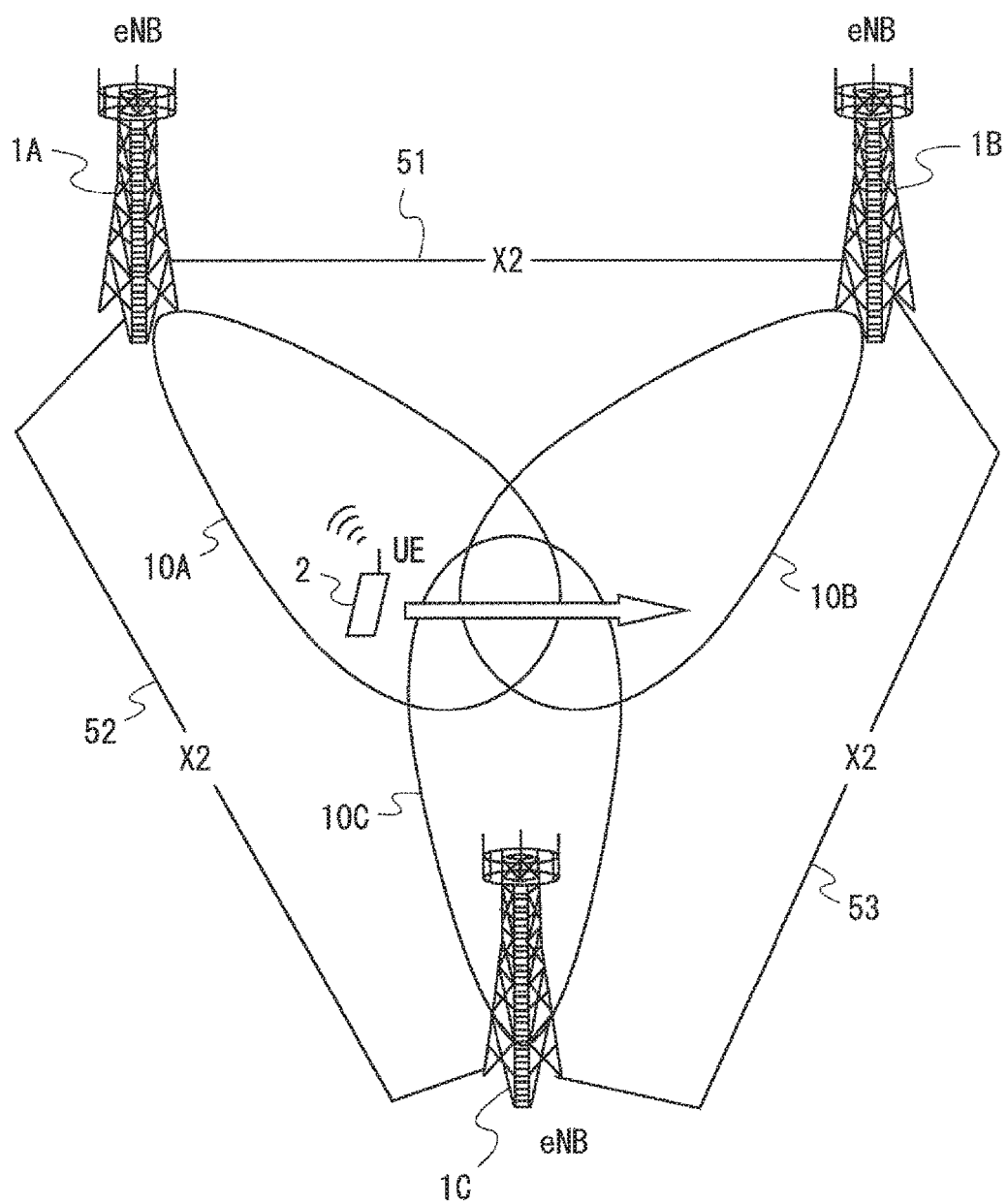
FIG. 15 is a diagram showing another configuration example of a radio communication system according to a fourth exemplary embodiment.

FIG. 15 shows a configuration example of a radio communication system according to this exemplary embodiment. Also, this exemplary embodiment is described assuming that the radio communication system is an LTE system or an LTE-Advanced system. The eNBs 1A, 1B, and 1C control the cells 10A, 10B, and 10C, respectively. The eNBs 1A and 1B establish the inter-base-station communication interface, i.e., the X2 interface (X2 link) 51, and thus can communicate with each other via the X2 interface 51. Similarly, the eNBs 1A and 1C establish an X2 interface (X2 link) 52, and thus can communicate with each other via the X2 interface 52. The eNBs 1B and 1C establish an X2 interface (X2 link) 53, and thus can communicate with each other via the X2 interface 53. Configuration examples of the eNB 1A, the eNB 1B, and the eNB 1C may be the same as those shown in FIG. 8, FIG. 9, or FIG. 10.

The second type of Too Late Handover is described above in the first to third exemplary embodiments, whereas the second type of Handover to Wrong Cell is described in this exemplary embodiment. Specifically, FIG. 15 shows a case where the UE 2 moves from the cell 10A toward the cell 10B via the cell 10C. The assumed handover scenario is as follows. The eNB 1A retains the NR from the cell 10A to the cell 10C, but does not retain the NR from the cell 10A to the cell 10B. Accordingly, the eNB 1A initiates handover of the UE 2 from the cell 10A to the cell 10C. However, during this handover procedure, the UE 2 experiences RLF in the source cell (cell 10A), and then the UE 2 attempts to re-establish the radio link connection (RRC connection) to the cell 10B which is different from both the source cell (cell 10A) and the target cell (cell 10C) of the handover. That is, the cell 10A is the source cell of the handover and is the failure cell where the RLF has occurred. The cell 10C is the target cell of the handover. The cell 10B is the re-establishment cell where the UE 2 has attempted to re-establish the radio link connection.

Figure 16A:
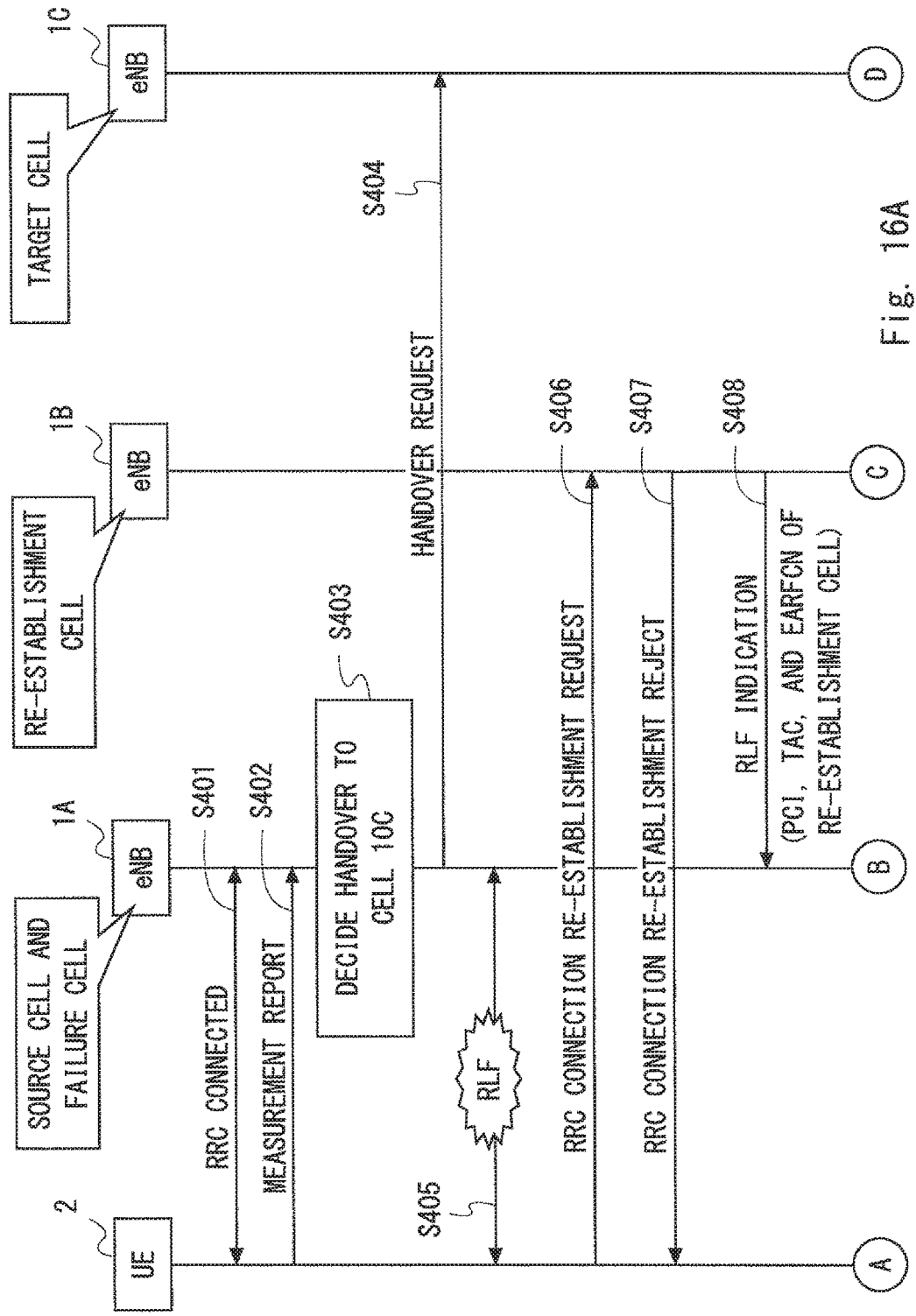
FIG. 16A is a sequence diagram showing an example of a control procedure according to the fourth exemplary embodiment.
Figure 16B:
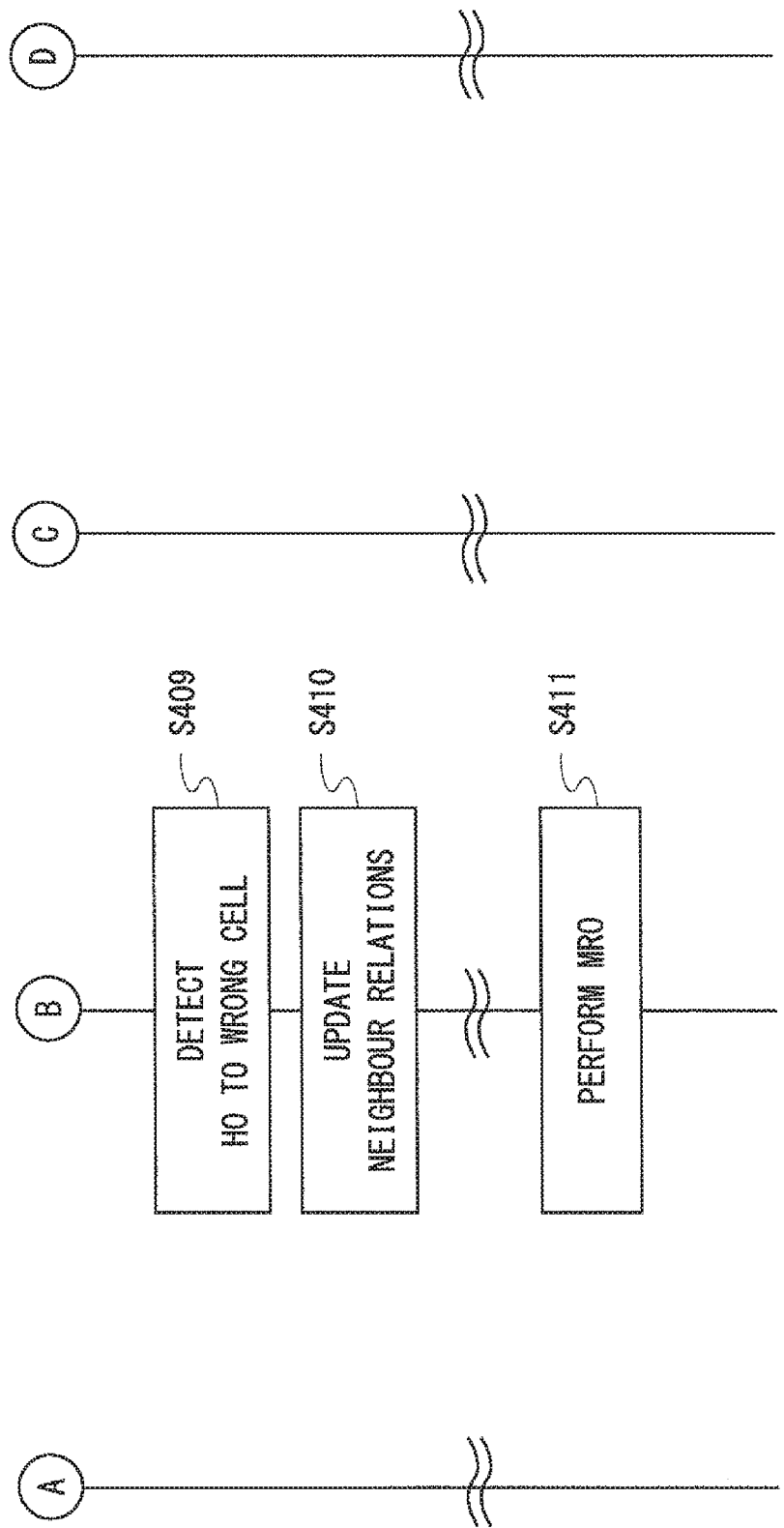
FIG. 16B is a sequence diagram showing an example of the control procedure according to the fourth exemplary embodiment.

FIGS. 16A and 16B illustrate a sequence diagram showing an example of the procedure of performing the ANR operation by the eNB 1A according to this exemplary embodiment. Note that as described above, the second type of Handover to Wrong Cell defined in this specification is similar to the second type of Too Late Handover defined in this specification in that the UE 2 has experienced the RLF in the source cell (cell 10A) and attempts to re-establish the RRC connection to another cell (cell 10B) to which the handover is not initiated. Accordingly, the procedure shown in FIGS. 16A and 16B is similar to the procedure shown in FIG. 4.

In step S401, the UE 2 establishes an RRC connection in the cell 10A of the eNB 1A. In other words, the UE 2 is in RRC_CONNECTED in the cell 10A.

In step S402, the UE 2 moves toward the cell 10C. Further, the UE 2 sends a measurement report to the eNB 1A in response to establishment of a measurement report transmission condition about the source cell 10A and the neighbour cell 10C (e.g., measurement report triggering condition for Events A3 (Neighbour becomes offset better than serving)). This measurement report triggers the eNB 1A to initiate a handover procedure.

In step S403, the eNB 1A determines handover of the UE 2 to the cell 10C based on the measurement report from the UE 2. The eNB 1A sends a HANDOVER REQUEST message to the eNB 1C controlling the cell 10C to initiate the handover procedure (step S404).

In step S405, the UE 2 experiences RLF involving disconnection of the RRC connection in the source cell (cell 10A) during the handover procedure.

In step S406, the UE 2 detects the cell 10B and attempts re-establishment of the RRC connection to the cell 10B. The RRC Re-establishment Request message transmitted in step S406 indicates "other failure" or "handover failure" as a reestablishment Cause. The "other failure" corresponds to, for example, "Radio Link Failure". The "handover failure" is set when the handover is not successfully completed within a predetermined time (Timer T304) after the UE has received the RRC Connection Reconfiguration message containing Handover Command (Mobility Control Information) from the eNB 1A of the source cell (cell 10A).

The processes in steps S407 to S411 are similar to the processes in step S103 to S108 shown in FIG. 4.

According to this exemplary embodiment, advantageous effects similar to those of the first to third exemplary embodiments are achieved for the second type of Handover to Wrong Cell.

Fifth Exemplary Embodiment

A configuration example of a radio communication system according to this exemplary embodiment may be the same as that shown in FIG. 15 described above in regard to the fourth exemplary embodiment. Configuration examples of the eNB 1A, eNB 1B, and eNB 1C according to this exemplary embodiment may be the same as those shown in FIG. 8, FIG. 9, or FIG. 10.

The first type of Handover to Wrong Cell is described in this exemplary embodiment. The assumed handover scenario is as follows. Referring to FIG. 15, the UE 2 moves from the cell 10A toward the cell 10B via the cell 10C. The eNB 1A retains the NR from the cell 10A to the cell 10C, but does not retain the NR from the cell 10A to the cell 10B. Accordingly, the eNB 1A initiates handover of the UE 2 from the cell 10A to the cell 10C. However, the UE 2 experiences RLF in the target cell (cell 10B) immediately after completion of the handover procedure or during the handover procedure, and then the UE 2 attempts to re-establish the radio link connection (RRC connection) to the cell 10B which is different from both the source cell (cell 10A) and the target cell (cell 10C) of the handover. That is, the cell 10A is the source cell of the handover, and the cell 10C is the target cell of the handover and is the failure cell where the RLF has occurred. The cell 10B is the re-establishment cell where the UE 2 has attempted to re-establish the radio link connection.

Figure 17A:
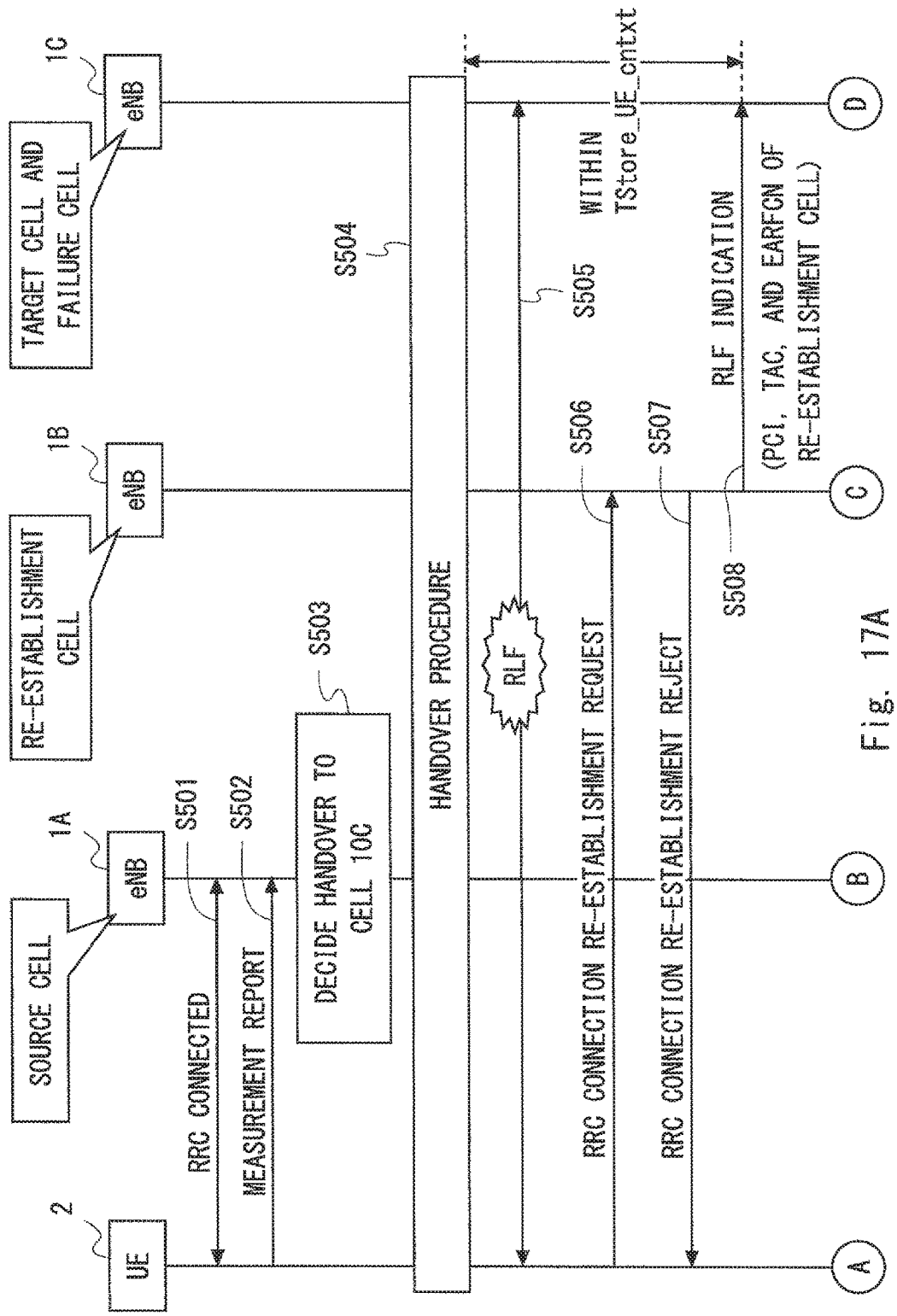
FIG. 17A is a sequence diagram showing an example of a control procedure according to a fifth exemplary embodiment.

FIGS. 17A and 17B illustrate a sequence diagram showing an example of the procedure of performing the ANR operation by the eNB 1A according to this exemplary embodiment. The processes in steps S501 to S503 are similar to the processes in step S401 to S403 shown in FIG. 16A.

In step S504, the eNB 1A performs a handover procedure with the eNB 1C and the UE 2, and completes the handover procedure. In step S505, the UE 2 experiences RLF involving disconnection of the RRC connection in the target cell (cell 10B) immediately after completion of the handover procedure. The timing of steps S504 and S505 may be before completion of the handover (i.e., transmission of a UE Context Release message from the target eNB 1C to the source eNB 1A) and after the UE 2 transmits an RRC Connection Reconfiguration Complete message indicating HANDOVER CONFIRM upon completion of synchronization of the UE 2 in the cell 10B.

In step S506, the UE 2 detects the cell 10B and attempts re-establishment of the RRC connection to the cell 10B. The RRC Re-establishment Request message transmitted in step S506 indicates "other failure" as a reestablishment Cause. The "other failure" corresponds to, for example, "Radio Link Failure".

In the case of FIGS. 17A and 17B, the eNB 1B retains no valid UE context of the UE 2. Accordingly, in step S507, the eNB 1B transmits an RRC Connection Re-establishment Reject message. The UE 2 transitions to RRC_IDLE in response to the RRC Connection Re-establishment reject message. After step S507, the UE 2 may initiate an RRC CONNECTION ESTABLISHMENT procedure involving transmission of an RRC Connection Request message to the eNB 1B in order to establish a new RRC connection.

The eNB 1C corresponds to the failure cell where the UE 2 has experienced the RLF. The eNB 1B corresponds to the re-establishment cell where the UE 2 has attempted RRC Connection Re-establishment. Accordingly, in step S508, the eNB 1B sends an RLF INDICATION message to the eNB 1C via the X2 interface 53. The RLF INDICATION message indicates that the UE 2 has attempted to re-establish the RRC connection to the cell 10C after the UE 2 has experienced the RLF involving disconnection of the RRC connection in the cell 10B.

The RLF INDICATION message sent in step S508 may be the "modified" RLF INDICATION message described in the first exemplary embodiment. Specifically, the RLF INDICATION message sent in step S508 may contain the PCI of the re-establishment cell (cell 10B). The RLF INDICATION message may further contain one or both of the TAC and EARFCN of the re-establishment cell (cell 10B).

In step S509, the eNB 1C detects Handover to Wrong Cell based on the reception of the RLF INDICATION message immediately after completion of the handover in step S504, i.e., within a predetermined time (TStore_UE_cntxt) after completion of the handover. In step S510, the eNB 1C sends a HANDOVER REPORT message to the source eNB 1A. The HANDOVER REPORT message indicates the type of the handover failure (i.e., Handover to Wrong Cell in this case), the ECGI of the source cell (cell 10A), the ECGI of the target cell (cell 10C) as the failure cell, and the ECGI of the other cell (cell 10B) as the re-establishment cell.

Further, the HANDOVER REPORT message sent in step S510 is modified so as to include additional information elements (IEs). Similarly to the modified RLF INDICATION message according to the first exemplary embodiment, the modified HANDOVER REPORT message includes the PCI of the re-establishment cell (cell 10B). The modified HANDOVER REPORT message may also include one or both of the TAC and EARFCN of the re-establishment cell (cell 10B). The eNB 1C may acquire the PCI, TAC, EARFCN, or the like of the re-establishment cell (cell 10B) from the RLF INDICATION message received in step S508.

FIG. 18 shows a specific example of the modified HANDOVER REPORT message. In the example shown in FIG. 18, the modified HANDOVER REPORT message contains information elements (IEs) indicating the PCI, TAC, and EARFCN of the re-establishment cell (cell 10B).

Referring to FIGS. 17A and 17B again, the description is continued. In step S511, the eNB 1A detects Handover to Wrong Cell based on the reception of the HANDOVER REPORT message from the eNB 1C. The eNB 1A stores the detected Handover to Wrong Cell in a memory (not shown) as handover failure history information.

The HANDOVER REPORT message from the eNB 1C indicates that the UE 2 has experienced RLF in the target cell (cell 10C) during a handover procedure from the source cell (cell 10A) to the target cell (cell 10C) or immediately after completion of the handover and has attempted to re-establish the RRC connection to another cell (cell 10B) which is different from both the source cell (cell 10A) and the target cell (cell 10C). Accordingly, in step S512, the eNB 1A adds a new neighbour relation (NR) from the cell 10A to the cell 10B to the NRT of the cell 10A in response to the reception of the HANDOVER REPORT message.

The order of steps S511 and S512 is not particularly limited. The process in step S511 can be executed separately from the process in step S512. The ANR process in step S512 may be performed prior to the process in step S511, or may be performed in parallel with the process in step S511.

In step S513, the eNB 1A executes the MRO for the cell 10A including the optimization of the handover parameters by using the stored handover failure history information. Prior to the MRO, the NR from the cell 10A to the cell 10B is added in step S512. Accordingly, the eNB 1A can perform the MRO on the handover parameters relating to the handover from the cell 10A to the cell 10B.

The sequence illustrated in FIGS. 17A and 17B is merely an example and may be modified as needed. For example, the PCI, TAC, EARFCN, or the like of the re-establishment cell (cell 10B) may be sent using any other X2 application protocol (X2AP) message different from both the RLF INDICATION message and the HANDOVER REPORT message. Alternatively, the eNB 1A may request a UE camped on the cell 10A to send the PCI or the like of the re-establishment cell (cell 10B).

According to this exemplary embodiment, advantageous effects similar to those of the first to third exemplary embodiments are achieved for the first type of Handover to Wrong Cell.

Sixth Exemplary Embodiment

This exemplary embodiment illustrates a modified example of the control procedure for the ANR operation described in the fifth exemplary embodiment. A configuration example of a radio communication system according to this exemplary embodiment may be the same as that shown in FIG. 15 described above in regard to the fourth and fifth exemplary embodiments. Configuration examples of the eNB 1A, the eNB 1B, and the eNB 1C according to this exemplary embodiment may be the same as those shown in FIG. 8, FIG. 9, or FIG. 10.

Similarly to the fifth exemplary embodiment, this exemplary embodiment describes the first type of Handover to Wrong Cell. The assumed handover scenario is as follows. The UE 2 experiences RLF in the target cell (cell 10C) after completion of a handover from the source cell (cell 10A) to the target cell (cell 10C), or during the handover. Further, the UE 2 transmits an RRC Connection Re-establishment Reject message to the cell 10B, which is different from both the source cell (cell 10A) and the target cell (cell 10C), and attempts to re-establish the radio link connection (RRC connection). Since the eNB 1B controlling the cell 10B has no valid UE context of the UE 2, the eNB 1B sends the RRC Connection Re-establishment Reject message to the UE 2.

The UE 2 according to this exemplary embodiment is configured to execute an RRC CONNECTION ESTABLISHMENT procedure with the eNB 1B after receiving the RRC Connection Re-establishment Reject message from the eNB 1B. The UE 2 is further configured to transmit to the eNB 1B an RRC message containing information about the source cell (cell 10A) during the RRC CONNECTION ESTABLISHMENT procedure or following the procedure. The information about the source cell (cell 10A) includes, for example, at least one of the ECGI, PCI, TAC, and EARFCN of the source cell (cell 10A). It should be noted herein that the source cell (cell 10A) differs from the failure cell where the RLF of the UE 2 has occurred. The failure cell where the RLF of the UE 2 has occurred is the target cell (cell 10C). Accordingly, the UE 2 reports, to the eNB 1B of the re-establishment cell (cell 10B), the information about the source cell (cell 10A), in which the UE 2 had established the RRC connection prior to the establishment of the RRC connection in the target cell (cell 10C), instead of or in addition to the information about the target cell (cell 10C) as the failure cell.

Figure 19A:
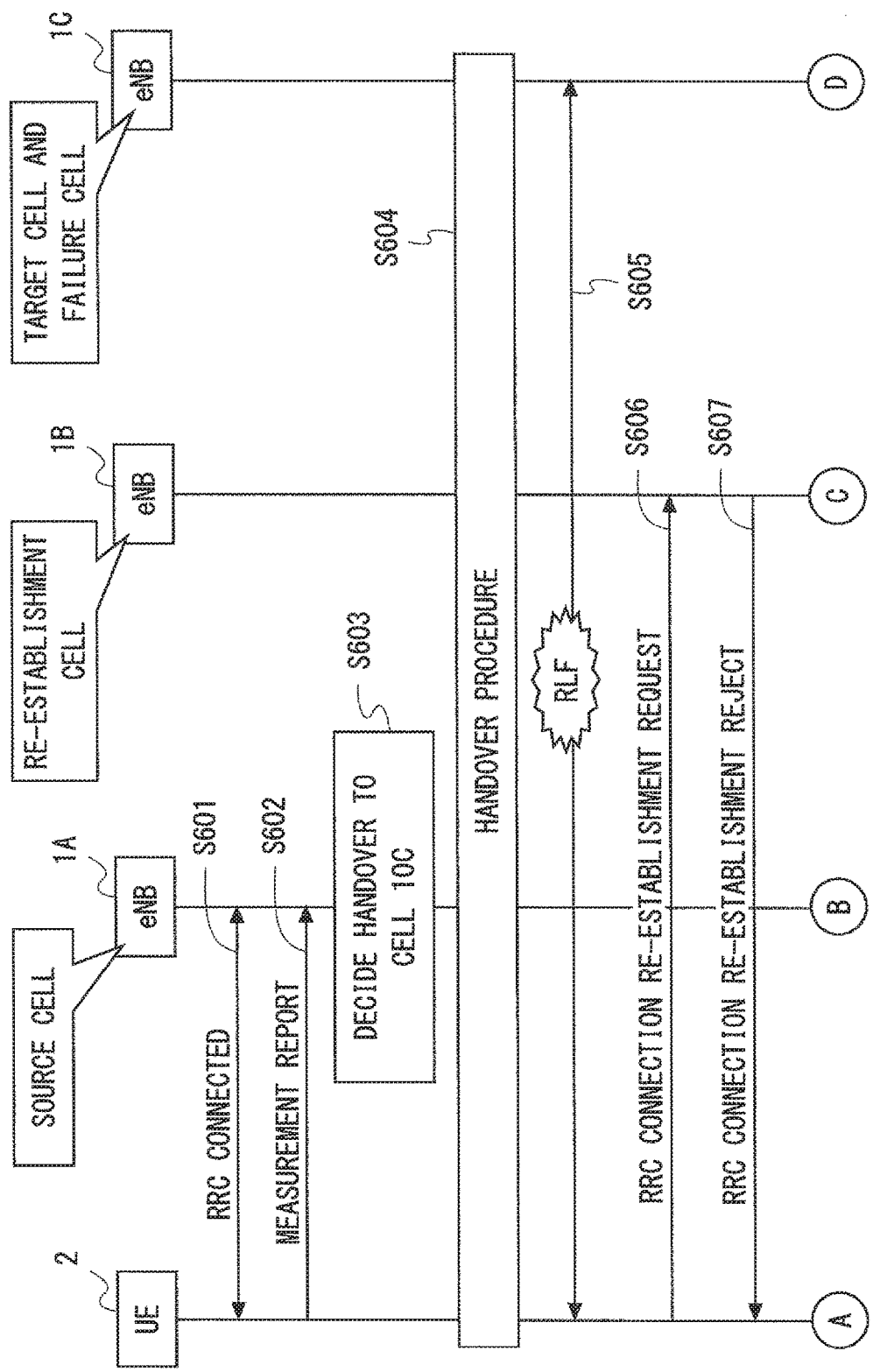
FIG. 19A is a sequence diagram showing an example of a control procedure according to a sixth exemplary embodiment.
Figure 19B:
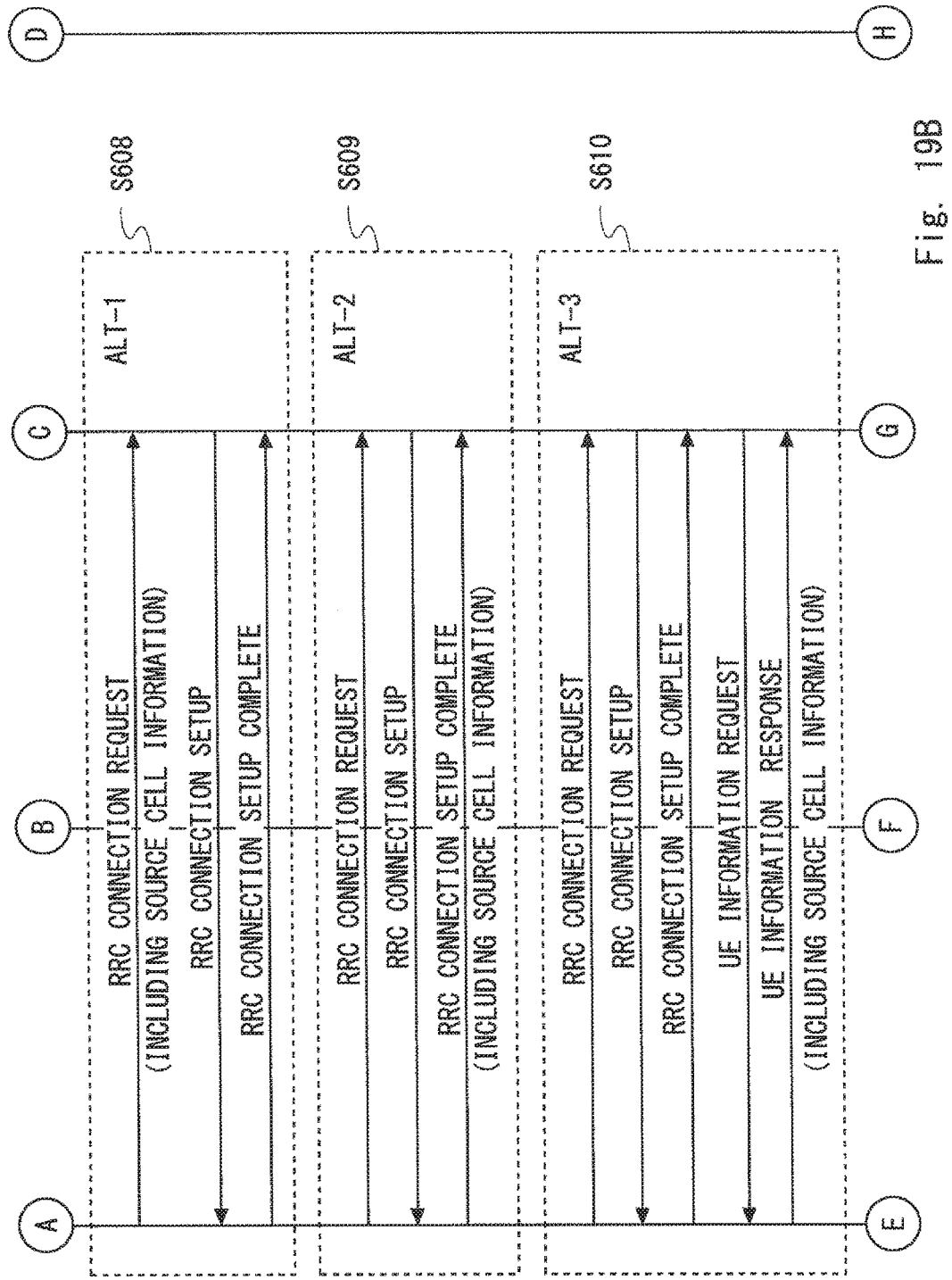
FIG. 19B is a sequence diagram showing an example of the control procedure according to the sixth exemplary embodiment.

FIGS. 19A to 19C illustrate a sequence diagram showing an example of the procedure of performing the ANR operation by the eNB 1A according to this exemplary embodiment. The processes in steps S601 to S607 are similar to the processes in steps S501 to S507 shown in FIG. 17A.

After receiving the RRC Connection Re-establishment Reject message in S507, the UE 2 executes step S608, S609B, or S610. Step S608 indicates an RRC CONNECTION ESTABLISHMENT procedure. In step S608, however, the UE 2 sends, to the eNB 1B, the information (e.g., ECGI, PCI, TAC, and EARFCN) about the source cell (cell 10A) using an RRC Connection Request message.

Step S609 also indicates an RRC CONNECTION ESTABLISHMENT procedure. In step S609, however, the UE 2 sends, to the eNB 1B, the information (e.g., ECGI, PCI, TAC, and EARFCN) about the source cell (cell 10A) using an RRC Connection Setup Complete message.

Step S610 also indicates an RRC CONNECTION ESTABLISHMENT procedure. In step S610, however, the UE 2 sends, to the eNB 1B, the information (e.g., ECGI, PCI, TAC, and EARFCN) about the source cell (cell 10A) after completion of the RRC CONNECTION ESTABLISHMENT procedure. Specifically, the UE 2 transmits a UE Information Response message in response to receiving a UE Information Request message from the eNB 1B. The existing UE Information Response message contains an UE RLF Report. The UE RLF Report contains the PCI, ECGI, and the like of the failure cell (i.e., the cell 10C in this case) where the UE 2 has experienced the RLF. In addition to this, the UE Information Response message in step S610 is modified so as to include the information (e.g., ECGI, PCI, TAC, and EARFCN) about the source cell (cell 10A). The UE 2 may send the information (e.g., ECGI, PCI, TAC, and EARFCN) about the source cell (cell 10A) to the eNB 1B by using a new RRC message different from the UE Information Response message.

The eNB 1B can detect Handover to Wrong Cell based on the information about the source cell (cell 10A) received from the UE 2 in any one of steps S608 to S610. In response to the detection of Handover to Wrong Cell, the eNB 1B sends a new X2AP message to the eNB 1A of the source cell (cell 10A) in step S612. This new X2AP message contains the PCI, TAC, EARFCN, and the like of the re-establishment cell (cell 10B). This new X2AP message may be a modification or expansion of the existing X2AP message. Specifically, in the procedure of this exemplary embodiment, the eNB 1B of the re-establishment cell (cell 10B) sends the PCI or the like of the re-establishment cell (cell 10B) directly to the eNB 1A of the source cell (cell 10A), instead of using the modified RLF INDICATION message and the modified HANDOVER REPORT message.

If the X2 interface (X2 link) 51 between the eNB 1A and the eNB 1B is not established yet, as shown in FIG. 19C, the eNB 1B may perform a procedure of establishing an X2/SCTP link prior to step S612 (step S611).

Steps S613 to S616 indicate the procedure for the normal MRO. In step S613, the eNB 1B sends an RLF INDICATION message to the eNB 1C. In step S614, the eNB 1C detects Handover to Wrong Cell based on the reception of the RLF INDICATION message. In step S615, the eNB 1C sends a HANDOVER REPORT message to the eNB 1A to notify the eNB 1A of Handover to Wrong Cell. In step S616, the eNB 1A detects Handover to Wrong Cell based on the reception of the HANDOVER REPORT message from the eNB 1C. The eNB 1A stores the detected Handover to Wrong Cell in a memory (not shown) as handover failure history information.

In step S617, the eNB 1A adds a new neighbour relation (NR) from the cell 10A to the cell 10B to the NRT of the cell 10A, in response to reception of the new X2AP message in step S612.

Note that the processes in steps S612 and S617 can be executed independently from the processes in steps S613 to S616. The processes in steps S612 and S617 may be performed prior to the processes in steps S613 to S616, or may be performed in parallel with the processes in steps S613 to S616.

The process in step S618 is similar to the process in step S513 shown in FIG. 17B.

Figure 20:
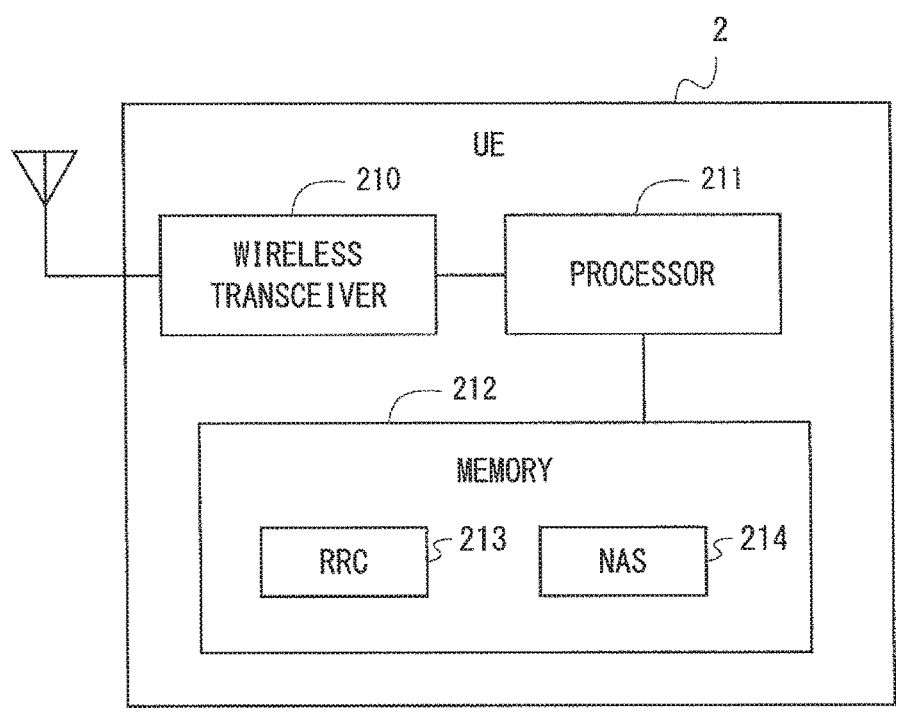
FIG. 20 is a diagram showing a configuration example of a UE according to the sixth exemplary embodiment.

Next, a configuration example of the UE 2 according to this exemplary embodiment is described. FIG. 20 shows a configuration example of the UE 2. Referring to FIG. 20, the UE 2 includes a wireless transceiver 210, a processor 211, and a memory 212. The wireless transceiver 210 is configured to communicate with an eNB.

The processor 211 loads software (computer program) from the memory 212 and executes the loaded software, thereby performing communication control including transmission and reception of RRC messages and NAS messages. The processor 211 may be, for example, a microprocessor, an MPU, or a CPU. The processor 211 may include a plurality of processors.

The memory 212 includes a volatile memory and a non-volatile memory. The volatile memory is, for example, an SRAM, a DRAM, or any combination thereof. The non-volatile memory is, for example, an MROM, a PROM, a flash memory, a hard disk drive, or any combination thereof.

In the example shown in FIG. 20, the memory 212 is used to store software modules including an RRC module 213 and a NAS module 214. The processor 211 loads the RRC module 213 from the memory 212 and executes the loaded module, thereby making it possible to transmit the RRC message containing the source cell information described in this exemplary embodiment.

According to this exemplary embodiment, advantageous effects similar to those of the first to third exemplary embodiments are achieved for the first type of Handover to Wrong Cell. Moreover, in this exemplary embodiment, the UE 2 notifies the eNB 1B controlling the re-establishment cell (cell 10B) of the information about the source cell (10A), in which the UE 2 had established the RRC connection prior to the establishment of the RRC connection in the failure cell (cell 10C). Accordingly, the eNB 1B can directly notify the eNB 1A of the information about the occurrence of Handover to Wrong Cell and can directly send to the eNB 1A the information (PCI, etc.) about the re-establishment cell (cell 10B) necessary for addition of an NR.

Other Exemplary Embodiments

In the exemplary embodiments described above, the information, such as the PCI, TAC, and EARFCN, of the Re-establishment Cell (cell 10B) may be sent to the eNB 1A via a core network node (e.g., an MME) or an OAM (e.g., Element Manager (EM) or Network Manager (NM)).

The processors included in the eNB 1A, the eNB 1B, the eNB 1C, and the UE 2 according to the above exemplary embodiments each execute one or more programs including a set of instructions for causing a computer to perform the algorithms described above with reference to the sequence diagrams and flowcharts.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

In the exemplary embodiments described above, the LTE/LTE-Advanced system has been mainly described. However, these exemplary embodiments may also be applied to Radio Access Technologies (RATs) other than the LTE/LTE-Advanced system (e.g., 3GPP UMTS, 3GPP2 CDMA2000 system (1×RTT, HRPD), GSM/GPRS system, or a WiMAX system).

When the above exemplary embodiments are applied to 3GPP UMTS, the operations of the eNB 1A, the eNB 1B, and the eNB 1C in the above exemplary embodiments may be performed by a NodeB, an RNC, or a combination thereof. In other words, the term "base station" used in this specification and claims refers to one or more entities located in a radio access network, for example, a UMTS NodeB, a UMTS RNC, or a combination thereof.

Furthermore, the above exemplary embodiments may be used not only for construction of Intra-RAT Neighbour Relations (NRs), but also for construction of Inter-RAT NRs. For example, the two base stations 1A and 1B shown in FIG. 3 may be base stations using different RATs. For example, the base station 1A may be an E-UTRAN base station (i.e., eNB), and the base station 1B may be a UTRAN base station (i.e., NodeB). For example, the base station 1A may be an E-UTRAN base station (i.e., eNB), and the base station 1B may be a non-3GPP (e.g., CDMA2000, GSM/GPRS) base station. Similarly, the base station 1C shown in FIG. 15 may be a base station using RAT different from that of the base station 1A.

The exemplary embodiments described above are merely examples of the application of the technical ideas obtained by the present inventor. That is, the technical ideas are not limited only to the exemplary embodiments described above, and the above exemplary embodiments may be modified in various ways.

This application is based upon and claims the benefit of priority from Japanese patent application No. 2014-055184, filed on Mar. 18, 2014, the disclosure of which is incorporated herein in its entirety by reference.

REFERENCE SIGNS LIST 1A, 1B, 1C Evolved NodeB (eNB)
2 USER EQUIPMENT (UE)
3A, 3B NODEB
10A, 10B, 10C CELL
40 NEIGHBOUR RELATION TABLE (NRT)
41 ENTRY RELATING TO NEIGHBOUR RELATION
51, 52, 53 X2 INTERFACE (X2 LINK)
60 OPERATION AND MAINTENANCE (OAM)
110 WIRELESS TRANSCEIVER
111 NETWORK INTERFACE
112 CONTROL UNIT
113 AUTOMATIC NEIGHBOUR RELATION (ANR) FUNCTION UNIT
120 WIRELESS TRANSCEIVER
121 NETWORK INTERFACE
122 PROCESSOR
123 MEMORY
124 RADIO RESOURCE CONTROL (RRC) MODULE
125 RADIO RESOURCE MANAGEMENT (RRM) MODULE
126 STREAM CONTROL TRANSMISSION PROTOCOL (SCTP) MODULE
127 X2 APPLICATION PROTOCOL (X2AP) MODULE
128 S1 APPLICATION PROTOCOL (S1AP) MODULE
129 OPERATION AND MAINTENANCE (OAM) MODULE
130 SELF-ORGANIZING NETWORK (SON) MODULE
131 NEIGHBOUR RELATION TABLE (NRT)
140 AUTOMATIC NEIGHBOUR RELATION (ANR) FUNCTION
141 NEIGHBOUR RELATION TABLE (NRT)
142 RADIO RESOURCE CONTROL (RRC) FUNCTION
143 X2 APPLICATION PROTOCOL (X2AP) FUNCTION
210 WIRELESS TRANSCEIVER
211 PROCESSOR
212 MEMORY
213 RADIO RESOURCE CONTROL (RRC) MODULE
214 NON-ACCESS STRATUM (NAS) MODULE

The invention claimed is:

1. A control apparatus comprising:
at least one memory configured to store a set of instructions and a neighbour relation table including a plurality of entries indicating neighbour-cell relations from a source cell to respective neighbour cells; and
at least one processor configured to execute the set of instructions to automatically update the neighbour relation table,
wherein the set of instructions further causes the at least one processor to add, to the neighbour relation table, a new entry indicating a neighbour-cell relation from the source cell to another cell different from both the source cell and a target cell of a handover from the source cell, in response to receiving by a base station controlling the source cell, from a base station controlling the another cell, from a base station controlling the target cell, or from a core network, a first message that is issued when a radio terminal that has experienced a failure involving disconnection of a radio link connection in the source cell or in the target cell attempts to re-establish the radio link connection to the another cell, and
wherein the first message contains at least a Physical Cell Identifier (PCI) of the another cell.

2. The control apparatus according to claim 1, wherein the first message is received via an inter-base-station communication link by a base station controlling the source cell.

3. The control apparatus according to claim 1, wherein the first message is an RLF INDICATION message sent from the base station controlling the another cell to the base station controlling the source cell.

4. The control apparatus according to claim 3, wherein the RLF INDICATION message is sent when the radio terminal has experienced a radio link failure in the source cell without initiating an outbound handover from the source cell and has attempted to re-establish the radio link connection to the another cell.

5. The control apparatus according to claim 3, wherein the RLF INDICATION message is sent when the radio terminal has experienced a radio link failure or a handover failure in the source cell during a handover from the source cell to the target cell and has attempted to re-establish the radio link connection to the another cell.

6. The control apparatus according to claim 1, wherein the first message is a HANDOVER REPORT message that is sent from the base station controlling the target cell to the base station controlling the source cell when the radio terminal has experienced a radio link failure in the target cell after completion of a handover from the source cell to the target cell or during the handover and has attempted to re-establish the radio link connection to the another cell.

7. The control apparatus according to claim 1, wherein the first message reaches the control apparatus via a core network node.

8. The control apparatus according to claim 1, wherein the set of instructions further causes the at least one processor to generate the new entry based on a first information element contained in the first message and a second information element that has been received from the base station controlling the another cell during a procedure of establishing a communication link between the base station controlling the source cell and the base station controlling the another cell.

9. The control apparatus according to claim 8, wherein
the first information element includes an E-UTRAN Cell Global Identifier (ECGI) of the another cell, and
the second information element includes the Physical Cell Identifier (PCI) of the another cell.

10. The control apparatus according to claim 1, wherein the set of instructions further causes the at least one processor to generate the new entry based on a first information element contained in the first message and further based on a second information element contained in a message that has been received via a communication link between the base station controlling the source cell and the base station controlling the other cell and indicates configuration update of the base station controlling the another cell.

11. The control apparatus according to claim 1, wherein the set of instructions further causes the at least one processor to perform optimization of a handover parameter relating to a handover from the source cell to the another cell.

12. A base station apparatus comprising:
at least one memory that stores a set of instructions; and
at least one processor configured to execute the set of instructions to control establishment of a radio link connection used to communicate between the base station apparatus and a radio terminal, wherein
the set of instructions further causes the at least one processor to send a first message to a first base station controlling a first cell when the radio terminal that has experienced a failure involving disconnection of a radio link connection in the first cell or in a second cell which is a target cell of a first handover from the first cell attempts to re-establish the radio link connection to a third cell different from both the first and second cells, and the first message contains at least a Physical Cell Identifier (PCI) of the third cell.

13. The base station apparatus according to claim 12, wherein
the first message is an RLF INDICATION message, and
the base station apparatus is a base station that controls the third cell.

14. The base station apparatus according to claim 13, wherein the RLF INDICATION message is sent from the base station apparatus to the first base station:
  (a) when the radio terminal has experienced a radio link failure in the first cell without initiating an outbound handover from the first cell and has attempted to re-establish the radio link connection to the third cell;
  (b) when the radio terminal has experienced a radio link failure or a handover failure in the first cell during the first handover and has attempted to re-establish the radio link connection to the third cell; or
  (c) when the radio terminal has experienced a radio link failure in the first cell after completion of a second handover from a fourth cell to the first cell or during the second handover has attempts to re-establish the radio link connection to the third cell.

15. The base station apparatus according to claim 12, wherein
the first message is a HANDOVER REPORT message,
the base station apparatus is a base station that controls the second cell, and
the HANDOVER REPORT message is sent from the base station apparatus to the first base station when the radio terminal has experienced a radio link failure in the second cell after completion of the first handover or during the first handover and has attempted to re-establish the radio link connection to the third cell.

16. The base station apparatus according to claim 15, wherein the set of instructions further causes the at least one processor to send the HANDOVER REPORT message to the first base station in response to receiving, from a base station controlling the third cell, an RLF INDICATION message indicating occurrence of the failure and containing at least a Physical Cell Identifier (PCI) of the third cell.

17. The base station apparatus according to claim 12, wherein
the first message triggers updating of a neighbour relation table in the first base station, and
the updating of the neighbour relation table includes adding, to the neighbour relation table, a new entry indicating a neighbour-cell relation from the first cell to the third cell.

18. A method for updating a neighbour relation table, the method comprising:
adding, to a neighbour relation table of a base station controlling a source cell, a new entry indicating a neighbour cell-relation from the source cell to another cell different from both the source cell and a target cell of a handover from the source cell, in response to receiving by a base station controlling the source cell, from a base station controlling the another cell, from a base station controlling the target cell, or from a core network, a first message that is issued when a radio terminal that has experienced a failure involving disconnection of a radio link connection in the source cell or in the target cell attempts to re-establish the radio link connection to the another cell,
wherein the first message contains at least a Physical Cell Identifier (PCI) of the another cell.

* * * * *